(12) United States Patent
Mantuano

(10) Patent No.: US 10,083,525 B2
(45) Date of Patent: Sep. 25, 2018

(54) MULTI-DIMENSIONAL COLOR AND OPACITY GRADATION TOOLS, SYSTEMS, METHODS AND COMPONENTS

(71) Applicant: Brian Mantuano, San Marcos, CA (US)

(72) Inventor: Brian Mantuano, San Marcos, CA (US)

( * ) Notice: Subject to any disclaimer, the term of this patent is extended or adjusted under 35 U.S.C. 154(b) by 0 days.

(21) Appl. No.: 15/485,150

(22) Filed: Apr. 11, 2017

(65) Prior Publication Data

US 2017/0294032 A1 Oct. 12, 2017

Related U.S. Application Data

(60) Provisional application No. 62/320,913, filed on Apr. 11, 2016.

(51) Int. Cl.
*G06T 11/00* (2006.01)
*G06T 19/20* (2011.01)

(52) U.S. Cl.
CPC .......... *G06T 11/001* (2013.01); *G06T 19/20* (2013.01); *G06T 2200/24* (2013.01); *G06T 2210/62* (2013.01)

(58) Field of Classification Search
CPC ... G06T 11/001; G06T 19/20; G06T 2210/62; G06T 2200/24
See application file for complete search history.

(56) References Cited

U.S. PATENT DOCUMENTS

| | | | | |
|---|---|---|---|---|
| 5,828,819 A * | 10/1998 | Do | ...................... | G06T 11/001 345/604 |
| 6,271,861 B1 * | 8/2001 | Sargent | .................. | G06T 15/50 345/589 |
| 6,784,896 B1 * | 8/2004 | Perani | .................. | G06T 11/001 345/423 |
| 2005/0237341 A1 * | 10/2005 | Gangnet | ............... | G06T 11/001 345/606 |
| 2008/0278479 A1 * | 11/2008 | Sun | ........................ | G06T 17/20 345/419 |
| 2009/0002376 A1 * | 1/2009 | Xu | ......................... | G06T 13/40 345/473 |

* cited by examiner

*Primary Examiner* — Maurice L. McDowell, Jr.
(74) *Attorney, Agent, or Firm* — Patrick M Dwyer

(57) ABSTRACT

A system for creating and rendering a color gradient field. The system includes a computer input device, a tangible computer-accessible storage medium, a processor coupled to the storage medium and a gradient stack editor. The editor creates a gradient stack data structure that includes a gradient paths, each path having a plurality of color and or opacity control points. Each path has a relative position within the gradient field. The data structure also has a secondary path extending into the gradient field.

The gradient stack editor also includes a plurality of effect tools that cause the processor to receive and store information to the gradient stack data structure and the information is indicative of gradient path attributes and color and or opacity control point attributes.

A gradient stack tool causes the processor to apply a gradient definition to the data of the gradient stack and to create a graphic document usable by an effect renderer.

17 Claims, 33 Drawing Sheets

(11 of 33 Drawing Sheet(s) Filed in Color)

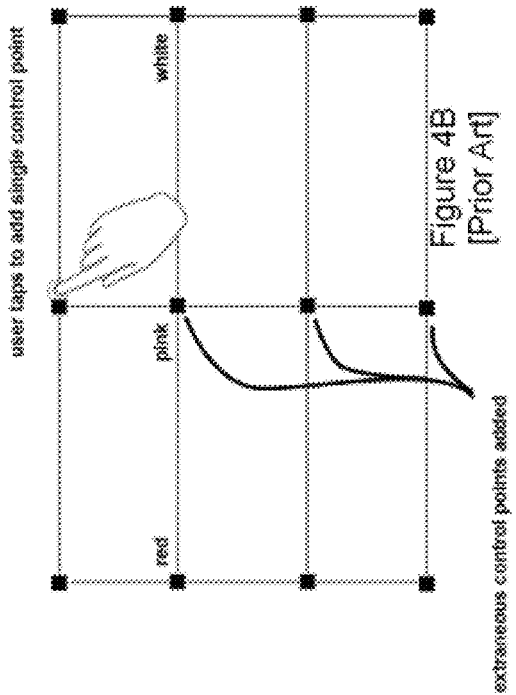
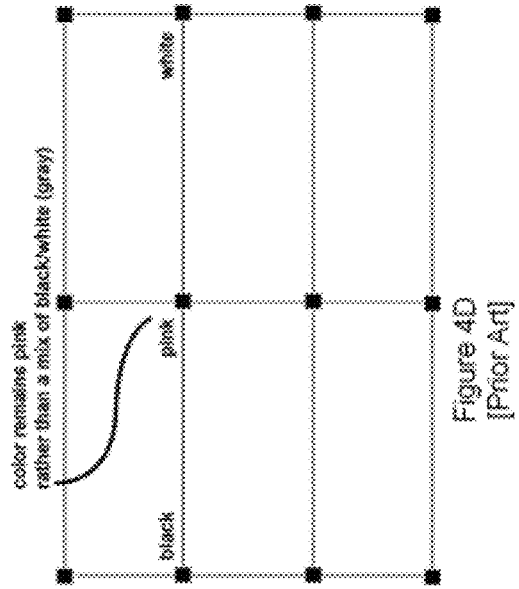
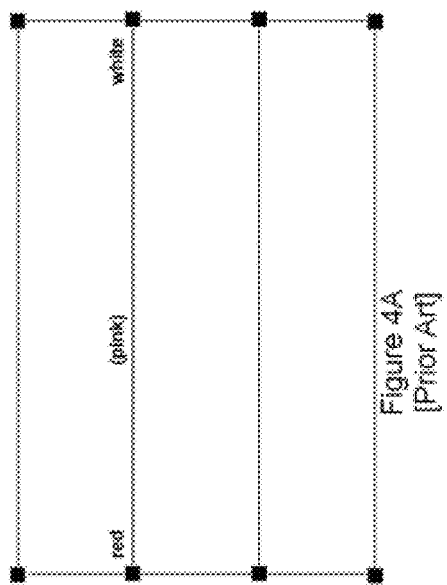
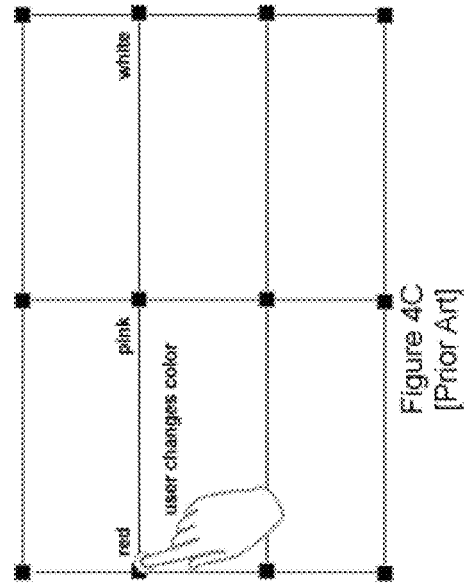

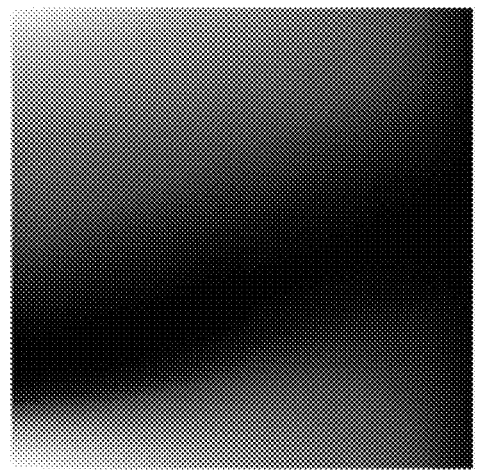
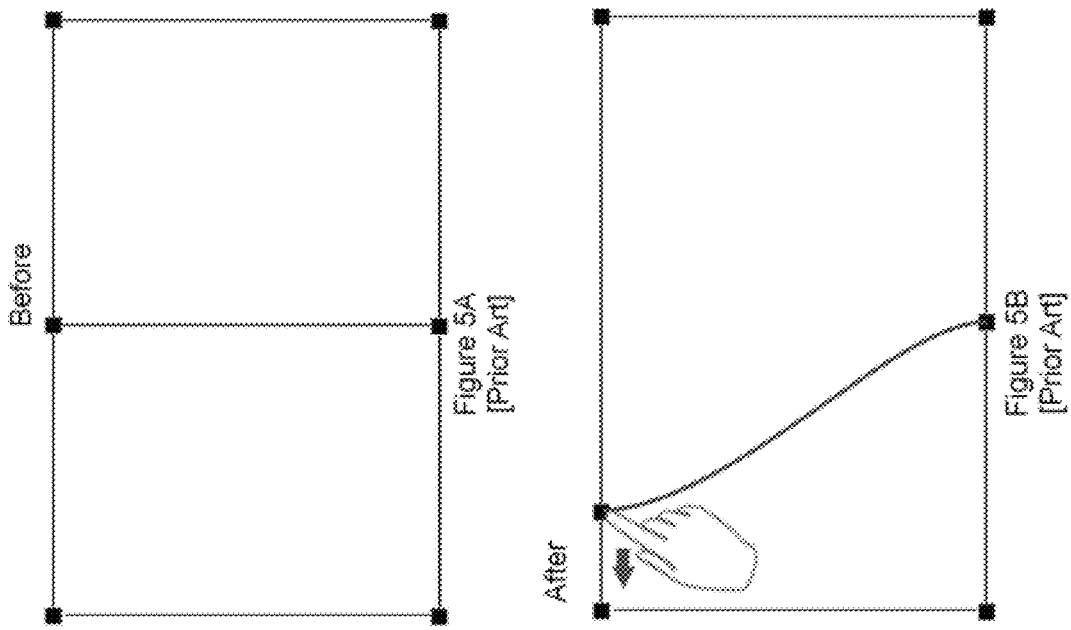
Figure 5C [Prior Art]
Figure 5A [Prior Art]
Figure 5B [Prior Art]

MULTI-DIMENSIONAL COLOR AND OPACITY GRADATION TOOLS, SYSTEMS, METHODS AND COMPONENTS

CROSS REFERENCE TO RELATED APPLICATIONS

This application claims priority to U.S. Provisional Patent application 62/320,913 filed Apr. 11, 2016, which is hereby incorporated by this reference as if fully set forth herein.

TECHNICAL FIELD

The disclosure relates to the field of graphic design and execution; more particularly, it relates to the realm of creating gradient fields for graphics, and more particularly to a system for multi-dimensional color and opacity gradation tools.

BACKGROUND

Many computer paint and drawing programs allow a user to fill an area with a single and or multiple colors. In the case of multiple colors, computer paint programs can automatically blend between the colors specified. This smooth blending between colors produces a color gradient. Conventional types of color gradients include linear gradients, radial gradients, and gradient meshes. All this same can be said for opacity gradients.

To fill a region with a linear gradient (whether color or opacity or both), a line segment is specified (e.g., on a virtual drawing canvas) and colors are associated with points along the line segment. For example, one endpoint of the line segment can be mapped to blue, the other endpoint can be mapped to red, and an intermediate point on the line segment can be mapped to yellow. The color and or opacity at any other point on the line segment is determined by interpolating (e.g., using linear or cubic interpolation or other methods known to those skillet in the arts) between the specified rotors.

At any other point in the region to be filled, the color is defined to be the same as the color of the point on the line segment which creates a perpendicular bisector to the line segment with the point in question. The user can choose multiple colors along the line segment and can generally specify the technique used to interpolate between colors (or select a conventional program that employs the desired technique), but a linear gradient is defined by a single line segment. The linear gradient is the most basic gradient of all and is typically not complex enough for advanced effects.

Radial gradients can be used to create slightly more complex effects than linear gradients. To create a radial gradient, a line segment is specified by selecting an initial point and an endpoint. As with linear gradients, colors and or opacities are associated with points along the line segment, and the color/opacity of any intermediate point on the line segment is determined by interpolating between the specified colors.

However unlike linear gradients, the color of any other point in the region to be filled is determined according to its distance from the initial point of the line segment. Thus, the resulting radial gradient comprises generally concentric rings of color that vary smoothly and continuously. Along the initial line segment, colors blend smoothly as they do in the ease of linear gradients. Points on other rays that begin at the initial point are colored to the same way (as the initial line segment), according to their distance from the initial point.

A gradient mesh is created using a two dimensional Bezier surface, specified by a mesh of control points, which are the intersections of line segments imposed upon the surface, each of which control points is associated with a color and or opacity. Each point in the region to be filled is colored by interpolating between the colors of nearby control points, using standard Bezier surface evaluation. The mesh gradient is more advanced than both linear and radial gradients; however, complex mesh gradients put a heavy burden on a user, as complex gradations can only be achieved by specifying the positions and colors of many control points.

Thus, linear and radial gradients are easy to use and to specify, but they typically generate staple color patients. A gradient mesh is more powerful, but is more difficult for designers to use. For example, as one author notes, in order to imitate the smooth gradation of color produced by an airbrush, the user is forced to think about increasing the complexity of the control mesh. It is also difficult to define a mesh gradient to fill a non-rectangular region, since Bezier surfaces are typically defined using quadrilateral meshes. Achieving a desired appearance is also time-consuming and non-intuitive, since more complicated effects generally require the user to individually move and color many control points.

Existing tools, which rely on a strict mesh, suffer from a number of drawbacks. For example, when the desired number of colors and opacities differs across the set of lines that make up the mesh, unnecessary control points are automatically generated (mesh intersections) and may need manual configuration and or removal by the user. Existing tools may interpolate the color/opacity values of the new control points such that the result appears acceptable. However, the existence of these additional control points may adversely affect the user's ability to make additional modifications to the effect.

Another drawback of conventional mesh tools is that positional adjustments made to the control points result in skewing of the cells and in noticeable distortion of the blending effect from any introduced curvature. Furthermore, conventional mesh tools do not provide a mechanism for applying the resulting effect in a repeated manner.

What is needed is a simplification of the process of creating multidimensional color and opacity gradations, and a method by which these gradations can be applied repeatedly. What is needed is a system that provides multiple single-path color and opacity gradients independently from each other that may then be combined programmatically to create color/opacity gradations along multiple paths.

DISCLOSURE

The disclosed system improves upon existing tools by simplifying the process of creating multidimensional color and opacity gradations, and introduces a method by which these gradations can be applied repeatedly. It overcomes the shortcomings of previous gradient systems by providing a system that provides multiple single-path color and opacity gradients independently from each other that may then be combined programmatically to create color/opacity gradations along multiple paths. Rather than applying blending within individual cells of a mesh, blending is applied in a prioritized fashion such that each entry within a stack of entries is handled individually and the colors and opacities for each entry are applied along their defined paths. Blending along a secondary path is then optionally applied against the resulting colors/opacities from the individual entries. In the disclosed system, outputs can be redefined even after they are set.

In this disclosure, the system will sometimes be referred to as a Gradient Stack Effect. This Gradient Stack Effect can include some or all of the following:

Definitions

Gradient Path. Also sometime referred to herein as a gradient, or a group of color and opacity stops, or a group of stops, or as offset slider or a gradient slider.

Color Control Points. Also referred to herein as stops, and color and opacity steps or thumbs. A color control point is a point (small region, segment or pixel or group of pixels) within a gradient field which defines one or more color attributes for that point within the effect. It may define the entirety of the color using typical color spaces (RGB, HSB, or the like), or only a single component of color, such as the Hue, Saturation, or Brightness. The combination of two or more color control points in addition to a path which crosses through them creates a gradient path.

Gradient Field. For purposes of this disclosure, a color gradient field is an assignment of gradated color and/or opacity attributes to a planar subset of space which has been divided into adjacent regions, the color and opacity gradually changing from region to region.

Gradient Definition. Information such as the colors and opacities of the gradient and the relative or absolute position of said colors and opacities along the path. The colors and opacities defined in the Gradient Definition need not be encoded as raw numeric values, but may instead be encoded as references to other entities, such as an ID of a color within a color palette. The Gradient Definition may also include details to define a more complex curve, such as secondary axis offsets for each control point or an entire set of curve control points.

Gradient Stack Annotator. Gradient Stack Annotator (sometimes Gradient Stack Modifier) provides in-line modification capability to the effect without the need to launch a Gradient Stack Editor and re-apply the effect using the Gradient Stack Tool. May advantageously be method or componentry or both.

Gradient Stack Definition. Desirably a computer readable format, which encapsulates the settings defined by the Gradient Stack Editor in order to sufficiently apply the Gradient Effect within a computer application. This Gradient Stack Definition includes, but is not limited to, one or more Gradient Definitions defining the individual gradient paths that compose the Gradient Stack. It also includes information such as the relative or absolute position of each of these individual gradient paths within the field. It may also include additional information that represents modifiers to be applied to an individual gradient path, such as one that defines the brightness of an entire individual gradient path to be increased by 10%. Additional metadata that does not pertain to the display of the gradient path may also be included, such as a name or author that should be associated with the Gradient Stack.

Gradient Stack. Gradient Stack is both method and componentry for storing individual gradient paths, also sometime referred to as just gradients and sometimes sliders.

Gradient Stock Renderers. Advantageously used to reader the Gradient Stack to a computer display. This may be for the purpose of providing a preview of what the effect will look like once applied, for applying the effect to a graphical document, or for the rendering of the final Gradient Stack Effect within a computer application.

Gradient Stack Editor. The inputs a Gradient Stack Editor serve to create and/or manipulate a Gradient Stack Definition, which can be used throughout the system. Slider controls, such as Gradient Sliders and/or Gradient Slider Thumbs, can be used to configure each Gradient within the Gradient Stack. Offsets of individual color/opacity stops within a Gradient can be modified by dragging such Gradient Slider Thumbs or by using keyboard input. Secondary path controls can be used to configure the manner in which the individual color and/or opacity gradients are blended together to produce the final effect.

Gradient Stack Tool. Provides application of a Gradient Stack as defined by the Gradient Definition to a graphical document or project.

Secondary Path. A secondary path is a straight or curved path within the gradient field that determines the direction of blending between individual gradient paths. The path may be defined and modified using common path manipulation methods, such as anchor points and handles, or may be preset or chosen from predefined options, such as a particular curved path or a straight vertical or horizontal path. Unlike gradient paths, secondary paths are not necessarily independent of one another; in other words, a secondary path, used for blended propagation between gradient paths, at least in the defined region of the path, may be thought of as a series of parallel paths or lines all of the same shape and direction as the secondary path. Each of these parallel secondary paths is a propagation 'line' from a selected point or small region on one gradient path to an intersection of that particular 'line' with another gradient path. Colors and opacities along each such 'line' at each point or small region of the 'line' will be interpolations between the point or small region of the one gradient path and the point or small region of the other gradient path with which it intersects. In some instances, more than one secondary path may be defined, each secondary path having its own defined region in the gradient field.

An example of the disclosed system is as follows: Gradient Definitions are created by the Gradient Stack Editor. The system receives user input which is loaded into a Gradient Stack. The system uses a Gradient Stack Tool to apply a Gradient Stock as defined by the Gradient Definition to a graphical document or project. The system uses outputs of the Gradient Stack Editor to create and/or manipulate a Gradient Stack Definition, which can be used throughout the system. The Gradient Stack Annotator provides in-line modifications to the effect without the need to re-launch the Gradient Stack Editor and re-apply the effect using the Gradient Stack Tool.

The system uses a Gradient Stack Editor that includes Slider controls, such as Gradient Sliders and/or Gradient Slider Thumbs, to configure each Gradient within the Gradient Stack. Offsets of individual color/opacity stops within a Gradient can be modified by dragging the Gradient Slider Thumbs or by using keyboard input. The system uses input from Gradient Stack Tool to provide a Gradient Stack as defined by the Gradient Definition to a graphical document or project. The system uses input from Gradient Stack Modifier to make modification to the Gradient Stack Effect.

The system uses input from Gradient Stack Renderers to render the Gradient Slack to a computer display. This can include providing a preview of what the effect will look like once applied, applying the effect to a graphical document, or rendering of the final Gradient Stack Effect within a computer application.

In the disclosed system specifying control points on a set of gradient paths is turned into a blended gradient field, and each gradient path and each control point is independent of any other gradient path and control point. Also secondary paths are advantageously introduced into a gradient field.

There are many ways of calculating blending in a blended gradient field, many of them extremely technical and mathematical. One reference talks about a color ramp and Gourand shading, and mapping images of the colors of control points onto the mesh from another mesh source. Another reference provides a mathematical extension of Bezier surfaces (which use a mesh). And another talks about a tessellation operation to create the mesh. One proposal uses residual energy minimizing calculations when comparing two meshes for translating to another format. They all have one thing in common: they all use a mesh. The disclosed system does not use a mesh, at least not in the ways disclosed previously.

A conventional graphics mesh consists of intersecting lines. The lines run over each other to the extent of the mesh boundaries, like a net. It is only at the intersection points that color control points are conventionally created. In a conventional mesh a new control point cannot be placed on a line in the mesh by itself. There must also be an intersecting line to get an intersection point. This is all built into conventional mesh calculation methods. Thus conventional mesh cells are not really independent of each other. The lines run through an entire mesh. Therefore changing something ON the line, changes it throughout the mesh.

The disclosed system doesn't use a mesh or cell as conventionally described. Only independent gradient paths are created, from which one or more secondary paths determine color blend directions into the gradient field.

The disclosed system allows for creating a number of gradient paths, each gradient path with two or more control points and each positionally independent of the other in the gradient field. Secondary paths determine the direction of the color and opacity propagation from one gradient path, at any selected point on the gradient path, across the gradient field to another gradient path.

A system, sometime referred to as Gradient Stack Effect, is disclosed for creating and rendering a field of color and or opacity gradients for use by a graphic display platform. The system desirably includes a computer input device, a tangible computer-accessible storage medium, a processor coupled to the storage medium, and a gradient effect modeler. The gradient effect modeler desirably includes a set of instructions which are stored in the storage medium and which, when executed by the processor cause the processor to create a gradient stack that has one or more gradient paths, each gradient path being independent of any others, each gradient path having one or more color and or opacity control points and a relative position, within a gradient field. The gradient stack also has a secondary gradient path. The instructions also cause the processor to calculate gradated color and opacity along each gradient path/based on the distance along the path to the most adjacent control points on the path and to calculate gradated color and opacity for the gradient field, using curves (or lines) parallel to the secondary path and the intersection of those parallels with the gradient paths and to render a gradient field model based on the calculations and send the gradient field model to a graphic display platform.

The disclosed system advantageously also includes a gradient stack editor that has a set of instructions that are stored in the storage medians and which, when executed by the processor cause the processor to display a gradient stack editor having a gradient field display and at least one gradient editing tool such as a gradient path positioning tool, a gradient path positioning thumb, a gradient offset selection tool, a gradient path addition tool, a gradient path removal tool, a secondary path selection tool, a control point, a control point addition tool, a control point removal tool, a color selection tool, an opacity selection tool, a control point offset selection tool, a gradient path offset selection tool, or a curve control point positioning tool.

The set of stored instructions further advantageously cause the processor to: receive and store information from the at least one gradient editing tool, the information indicative of gradient path attributes or color and opacity control point attributes; to re-calculate gradated color and opacity along each gradient path based on the distance along the path to the most adjacent control points on the path and to re-calculate gradated color and opacity for the gradient field, using curves (or lines) parallel to the secondary path and the intersection of those parallels with the gradient paths and display the re-calculated gradient filed within the gradient field display.

In any embodiment of the disclosed system, any one or more of the one or more gradient paths can be a line or a carved line. The system can have a plurality of gradient paths, where at least one gradient path is a curved line. The system color selection tool is advantageously a color picker, and the opacity selection tool is an opacity picker.

A method is disclosed for creating and rendering a field of color gradients for use by a graphic display platform. The method includes the step of creating a gradient stack, the gradient stack comprising one or more gradient paths, where each gradient path is independent of any others and each gradient path includes one or more color and or opacity control points, a relative position within a gradient field, and secondary gradient path.

The method also includes the steps of calculating gradated color and opacity along each gradient path based on the distance along the path to the most adjacent control points on the path, calculating gradated color and opacity for the gradient field, using curves (or lines) parallel to the secondary path and the intersection of those parallels with the gradient paths and rendering a gradient field model based on the calculations and sending the gradient field model to a graphic display platform.

The disclosed method advantageously also includes the step of displaying a gradient stack editor, the display comprising a gradient field display, and at least one gradient editing tool such as a gradient path positioning tool, a gradient path positioning thumb, a gradient offset selection tool, a gradient path addition tool, a gradient path removal tool, a secondary path selection tool, a control point, a control point addition tool, a control point removal tool, a color selection toot, an opacity selection tool, a control point offset selection tool, a gradient path offset selection tool, or a curve control point positioning tool.

The method also advantageously includes the steps of receiving and storing information from the at least one gradient editing tool, the information indicative of gradient path attributes or color and opacity control point attributes; re-calculating gradated color and opacity along each gradient path based on the distance along the path to the most adjacent control points on the path, re-calculating gradated color and opacity for the gradient field, using curves (or lines) parallel to the secondary path and the intersection of those parallels with the gradient paths, and displaying the re-calculated gradient field within the gradient field display.

An alternate system is also disclosed for creating and rendering a color gradient field. The alternate system desirably includes a computer input device, a tangible computer-accessible storage medium, a processor coupled to the storage medium and a gradient effect modeler. The gradient effect modeler includes a set of instructions which are stored in the storage medium and which, when executed by the processor, cause the processor to do the following:

1. Create a gradient stack with a plurality of gradient paths, each gradient path having a plurality of control points and a relative position within a gradient field. The gradient stack also has a secondary path that intersects the gradient paths in the gradient field. Each control point can be a color control point, an opacity control point, or a combined color and opacity control point. Any one gradient path is positionally independent of any other gradient path in the gradient field, and each control point is positionally independent of any other control point.

2. Instantaneously calculate a gradated color and or opacity along each gradient path, using each of a series of first selected regions of the gradient path. For each first selected region, the gradated color and or opacity is assigned based upon (1) color and or opacity of control points along the gradient path adjacent each first selected region, and (2) relative distances between the first selected region and the adjacent control points.

In other words, 1) divide each gradient path into line segments, 2) color each line segment based on the closest control points which are on the gradient path and how close they are. The term 'region' has bees chosen because line segments theoretically have no thickness. A 'region' can be a single point on the gradient path or line, and could even be a single pixel, for example.

3. Instantaneously calculate a gradated color and or opacity over the gradient field along the secondary path, using each of a series of second selected regions of the secondary path. For each second selected region, a color and or opacity is assigned based upon 1) the color and or opacity of the first selected region on the gradient path from which the secondary path extends and the color and or opacity of point or small region on the gradient path that the secondary path intersects, and 2) relative distances between the second selection region and the extended from and intersected gradient paths.

In other words, 1) extend a series of regions out from the gradient path along the secondary path, and 2) color each region based on the color of the line segment from which you started and the color of the segment on the other gradient path toward which the secondary path is heading and with which it intersects.

It should also be noted again that secondary paths may be defined independent of each other. For example, the slant of a secondary path over which color and the like propagate into the gradient field might be 30 degrees at the left side and 90 degrees at the right side of a gradient path in a gradient field. Or a curving gradient path might have a deeper curve on the right side than on the left and thus also affect a secondary path originating on the curved line.

4. Instantaneously render a gradient field model based on the calculations.

In this alternate system, a position of each control point within the gradient field is selectively re-positionable, independent of any other control point, whether existing or later added. Similarly, a color of each control point is selectively re-colorable, independent of any other control point, whether existing or later added, and a position of each gradient path within the gradient field is selectively re-positionable, independent of any other gradient path, whether existing or later added.

The set of instructions when executed by the processor also cause the processor to instantaneously send the gradient field model to a graphic display platform. Each gradient paths can optionally be a straight line or a curved line.

The system also advantageously includes a gradient stack editor that has a set of instructions which are stored in the storage medium and which, when executed by the processor cause the processor to do the following:

1. Display a gradient stock editor that has a gradient field display, and at least one of the following gradient editing tools: a gradient path positioning tool, a gradient path positioning thumb, a gradient offset selection tool, a gradient path addition tool, a gradient path removal tool, a secondary path selection tool, a control point, a control point addition tool, a control point removal tool, a color selection tool, an opacity selection tool, a control point offset selection tool, a gradient path offset selection tool, and a curve control point positioning tool.

2. Receive and store information from at least one gradient editing tool.

3. Instantaneously re-calculate gradated color and opacity for the gradient field.

4. Instantaneously display the re-calculated gradient field within the gradient field display.

It should be noted that it is possible that not every editing input event requires re-calculating the color for the gradient path, such as, for example, repositioning a gradient slider (path).

In the alternate system a secondary path can optionally be orthogonal to at least one of the gradient paths or angled to at least one of the one or more gradient paths, and any secondary path is independent from any other secondary path. A first secondary path ever which a gradient pate propagates its colors in the gradient field is optionally at a first angle at a first position on the gradient path, and a second secondary path is optionally at a second angle at a second position on the gradient path.

An alternate method is also disclosed for creating and rendering a color gradient field. The method includes the following steps.

1. Creating, by instructions executed by a processor, a gradient stack with a plurality of gradient paths, each gradient path having a plurality of control points and a relative position within a gradient field. The gradient stack also has a secondary path that intersects the gradient paths in the gradient field. Each control point can be a color control point, an opacity control point, or a combined color and opacity control point. Any one gradient path is positionally independent of any other gradient path in the gradient field, and each control point is positioned independent of any other control point.

2. Instantaneously calculating by instructions executed by a processor, a gradated color and or opacity along each gradient path, using each of a series of first selected regions of the gradient path. For each first selected region, the gradated color and or opacity is assigned based upon (1) color and or opacity of control points along the gradient path adjacent each first selected region, and (2) relative distances between the first selected region and the adjacent control points.

3. Instantaneously, by instructions executed by a processor, calculating a gradated color and or opacity over the gradient field along the secondary path, using each of a series of second selected regions of the secondary path. For each second selected region, a color and or opacity is assigned based upon 1) the color and or opacity of the first selected region on the gradient path from which the secondary path extends and the color and or opacity of point or small region on the gradient path that the secondary path intersects, and 2) relative distances between the second selected region and the extended from and intersected gradient paths.

4. Instantaneously rendering, by instructions executed by a processor, a gradient field model based on the calculations, and sending, by instructions executed by a processor, the gradient field model to a graphic display platform.

The method advantageously also includes some or all of the following steps:
1. Displaying, by instructions executed by a processor on a visual display device, a gradient stack editor The gradient stack editor display includes a gradient field display, and at least one of the following gradient editing tools: a gradient path positioning tool, a gradient path positioning thumb, a gradient offset selection tool, a gradient path addition tool, a gradient path removal tool, a secondary path selection tool, a control point a control point addition tool, a control point removal tool, a color selection tool, an opacity selection tool, a control point offset selection tool, a gradient path offset selection tool, and a curve control point positioning tool.
2. Receiving, by instructions executed by a processor, and storing, in a tangible storage medium, information from the at least one gradient editing tool.
3. Re-calculating, by instructions executed by a processor, gradated color and or opacity for the gradient field.
4. Displaying, by instructions executed by a processor, on a visual display device the recalculated gradient field within the gradient field display.

A further alternate system for creating and rendering a color gradient field is disclosed. The system desirably includes a computer input device, a tangible computer-accessible storage medium, a processor coupled to the storage medium and a gradient stack editor. The gradient stack editor has a set of instructions which are stored in the storage medium and which, when executed by the processor, cause the processor to create a gradient stack data structure residing on the storage medium. The gradient stack data structure includes one or more gradient paths, each gradient path having one or more color and or opacity control points and a relative position within a gradient field. The gradient stack data structure also includes a secondary path extending into the gradient field wherein each gradient path is independent of any others, and each color and or control point is independent of any others.

The gradient stack editor also includes a plurality of effect tools, the tools having respective sets of instructions which are stored in the storage medium and which, when executed by the processor, cause the processor to receive the set of instructions and store information to the gradient stack data structure residing on the storage medium. The information is imitative of gradient path attributes and color and or opacity control point attributes.

The system also includes a gradient slack tool having a set of instructions which are stored in the storage medium and which, when executed by the processor, cause the processor to apply a gradient definition to the data of the gradient stack and to create a graphic document usable by an effect renderer.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIGS. 4A-4D are illustrations of a conventional problem in adding control points to a gradient mesh.

FIGS. 5A-5C are illustrations of another conventional problem in adding control points to a gradient mesh.

FIGS.

DETAILED DESCRIPTION

Various examples of the disclosed systems and methods are now discussed with reference to the drawings, wherein like numbers refer to like parts.

Figure 1:
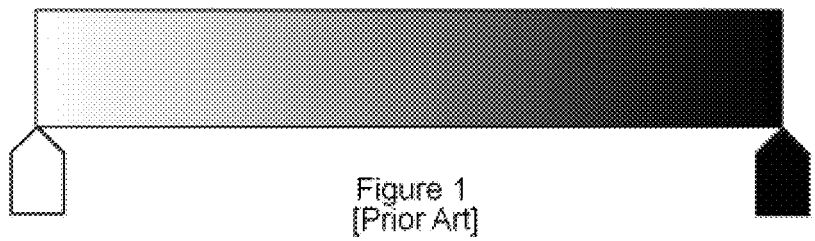
FIG. 1 is an illustration of conventional gradient line color blending.
Figure 2:
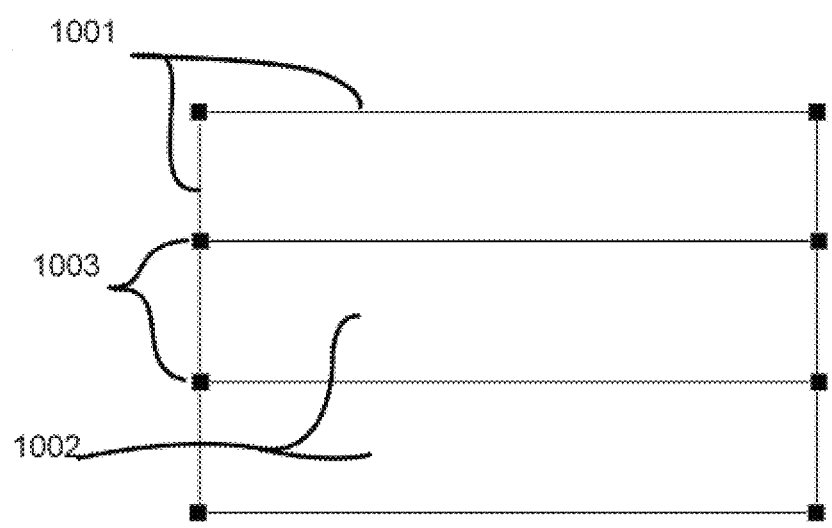
FIG. 2 is a schematic diagram of conventional gradient mesh color blending.
Figure 3:
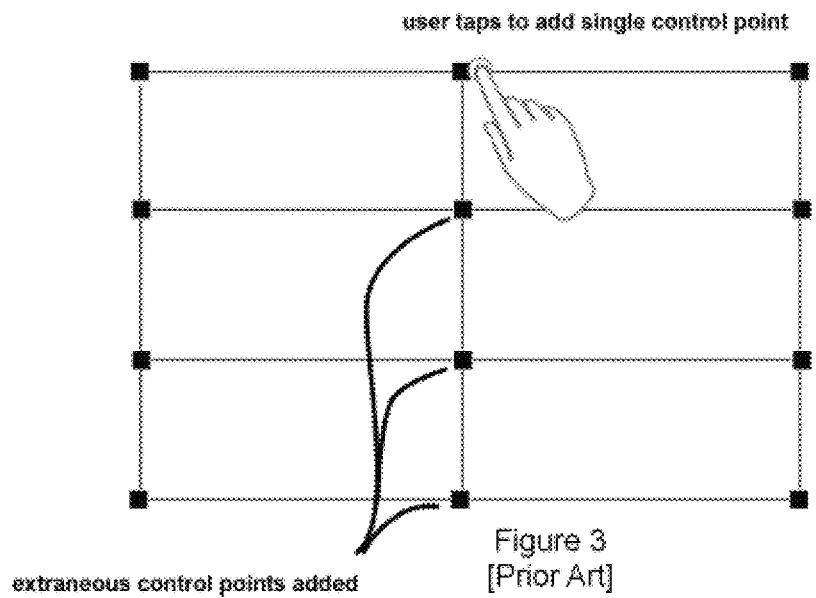
FIG. 3 is an illustration of a conventional method to add control points to a gradient mesh.

FIGS. 1-5 show various states of the art. FIG. 1 is an illustration of conventional gradient line color blending, FIG. 2 is a schematic diagram of conventional gradient mesh color blending, FIG. 3 is an illustration of a conventional method to add control points to a gradient mesh. FIGS. 4a-4d are an illustration of a conventional problem in adding control points to a gradient mesh, and FIGS. 5a-5c are an alternate illustration of a conventional problem in adding control points to a gradient mesh.

Conventional gradient applications provide limited controls for creating color and opacity gradations. The most commonly available forms provide the ability to blend colors along a single vector or path only, such as through a linear gradient tool or radial gradient tool. As an example, a linear gradient tool allows user to create a blend from two user-selected colors, such as white and black, in a linear fashion such that each point along the line results in a shade of grey corresponding to its position along the line (FIG. 1).

Other tools available that provide the ability to blend colors along multiple vectors simultaneously only do so in a strict, mesh-like structure, sometimes referred to as a gradient mesh tool (FIG. 2). With this type of tool, the blending of colors is performed between user-configured control points 1003 that are arranged in a mesh. The mesh is comprised of two sets of intersecting lines 1001, also referred to as 'mesh lines', that span the entirety of the mesh bounds. The intersection, or 'control points', 1003 of four these lines define cells 1002. Users are able to interact with intersection 'control points' 1003 only by repositioning them and assigning color and/or opacity values to them. The four control points of each cell define the blending of colors/opacities that is applied across the cell.

These conventional tools which rely on a strict mesh suffer from a number of drawbacks. For instance (FIG. 3), when a new control point 1003 is desired on one horizontal mesh line 1001, unnecessary additional control points are created and may need manual configuration or removal by the user. These additional control points may also adversely affect the ability to make additional modifications to the effect. FIGS. 4A-4D illustrate an example adverse sequence.

FIGS. 5A-5C illustrate the drawback of conventional positional adjustments in made to one control point (FIG. 8A) resulting in a kind of skewing of cells, with noticeable distortion (FIG. 5C) of the blending effect (from a curvature unintentionally introduced, when moving one control point to the left does not also move the unwanted control point previously introduced below it FIG. 5B).

Figure 6A:
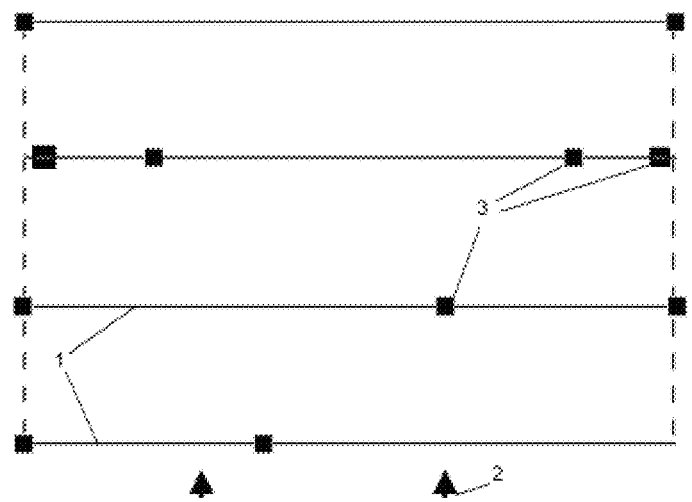
FIG. 6A is schematic diagram of a gradient slack editor according to one embodiment of the disclosed color gradient modeler.
Figure 6B:
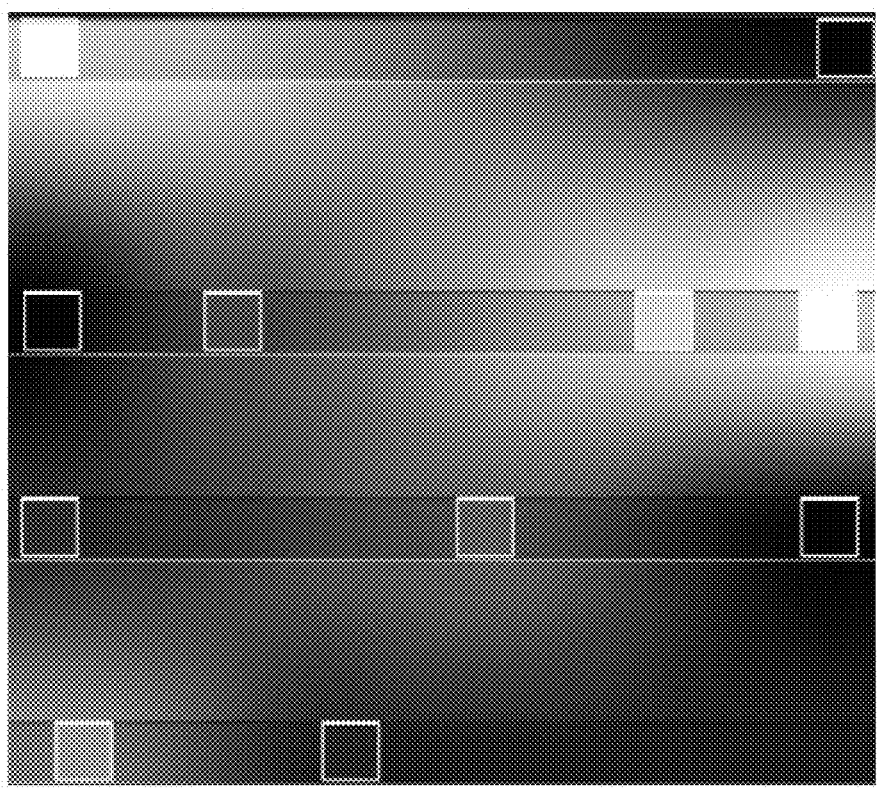
FIG. 6B is a color illustration of a rendered gradient field according to the gradient stack of FIG. 6A.

One embodiment of the disclosed subject matter as applied along horizontal and vertical axes is demonstrated in FIGS. 6A-6B. Each horizontal line 1 represents a simple linear gradient of one or more colors, which are denoted by control points 3 along horizontal lines 1. Any number of horizontal lines can be added and positioned within the tool and each horizontal line may contain any number of control points that define the gradient effect to be applied horizontally across that line 1. Control points 3 can also be moved vertically, as generally represented by arrows 2, to define vertical application of the gradient effect. Persons skilled in the art will appreciated that terms like horizontal and vertical are relative terms and may be reversed as needed or appropriate, or even substituted with other like terms and in orientations that are neither horizontal or vertical.

The disclosed system allows multiple single path color and opacity gradients to be configured independently from each other and then combined in order to create color/opacity gradations along multiple paths. This is also referred to herein as a Gradient Stack Effect. Bather than applying blending within individual cells of a mesh (which is all that is possible with conventional gradient mesh tools), blending is applied in a prioritized fashion along the paths (and between them) such that each entry within the stack is handled individually and the colors and opacities for each entry are applied along a primary path. Blending along a secondary path is then also applied against the resulting colors/opacities from the individual stack (path) entries it there are more than one gradient path.

FIGS. 6A-6B demonstrate colors/opacities applied along horizontal and vertical axes. Each horizontal line in the figures represents a single gradient path which is a simple linear gradient of one or more colors, each of which (colors, and or opacities for that matter) are denoted by control points along the line. Any number of horizontal lines (gradient paths) can be added and positioned within the tool and each gradient path may contain any number of control points to define a gradient effect to be applied horizontally across that path.

FIGS. 6A-6B (and also to differing extent FIGS. 8A-8B, FIGS. 12A-12D and FIG. 19) illustrate what is said throughout this disclosure about the ability to manipulate gradient paths and control points independently from one another and about the method and means by which color and opacity propagation and blending is done. These figures also illustrate 'secondary path' and how it affects color and opacity propagation and blending.

Figure 7C:
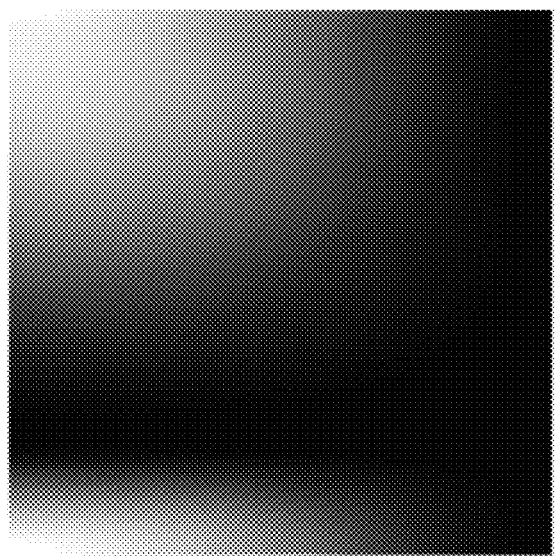
FIG. 7C is an illustration of a rendered gradient field according to the gradient stack of FIGS. 7A-B.
Figure 7A:
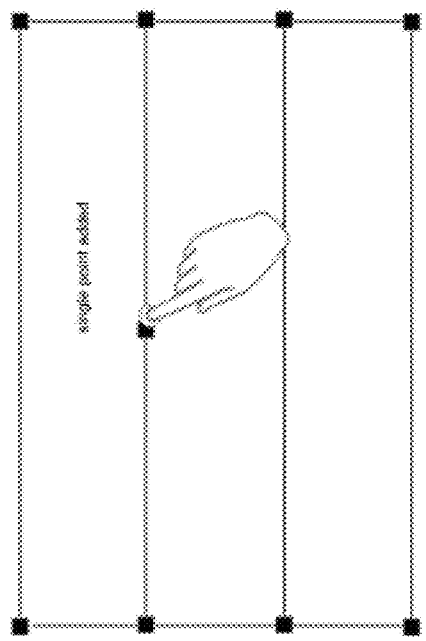
FIGS. 7A-7B are schematic diagrams of a sequence of steps using the gradient stack editor of FIG. 6A.
Figure 7B:
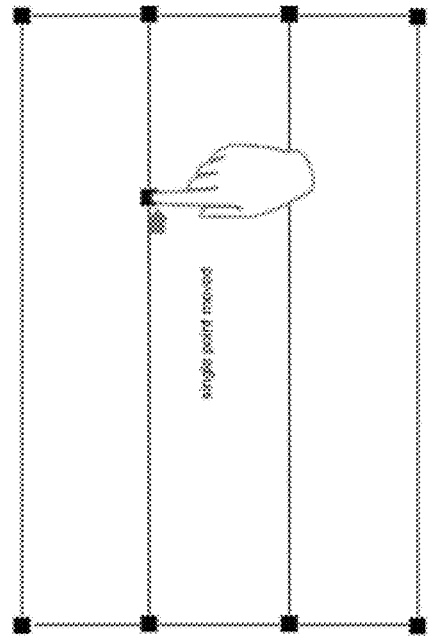

As shown in FIGS. 7A-7C, control points can be added/removed to/from any path using conventional computer inputs, such as through a computer mouse, keyboard or touch input. Unlike a conventional mesh tool, the number of control points that make up each gradient path is free to vary across the set of lines, and a control point can be added to one entry within the stack (one gradient path) without introducing additional and unintended control points throughout all the other entries (lines or curves) that comprise the stack. And adjustments made to one entry (line or curve 1) within the stack do not result in skewing.

Figure 8A:
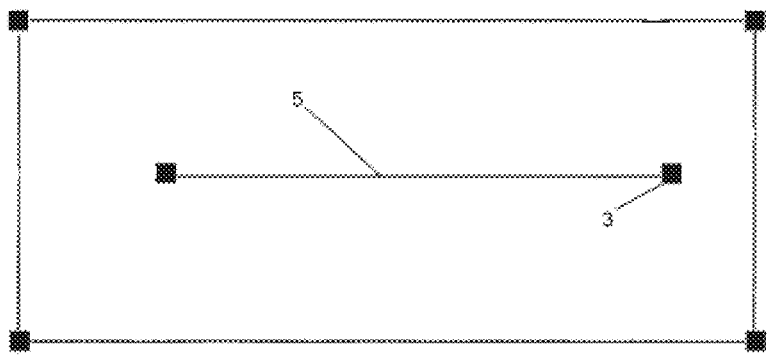
FIG. 8A is a schematic diagram of a gradient stack where a gradient path does not span the entirety of the wide of the gradient field.
Figure 8B:
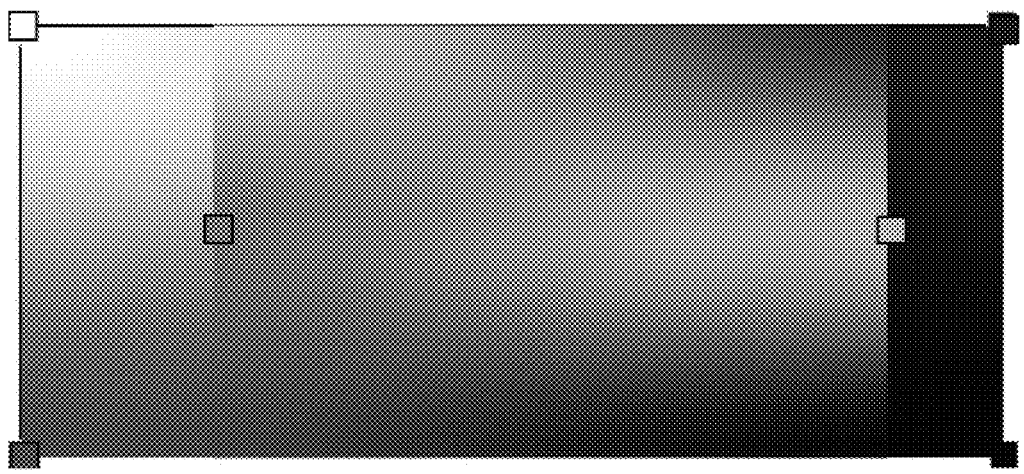
FIG. 8B is a color illustration of a rendered gradient field according to the gradient stack of FIG. 8A.
Figure 9A:
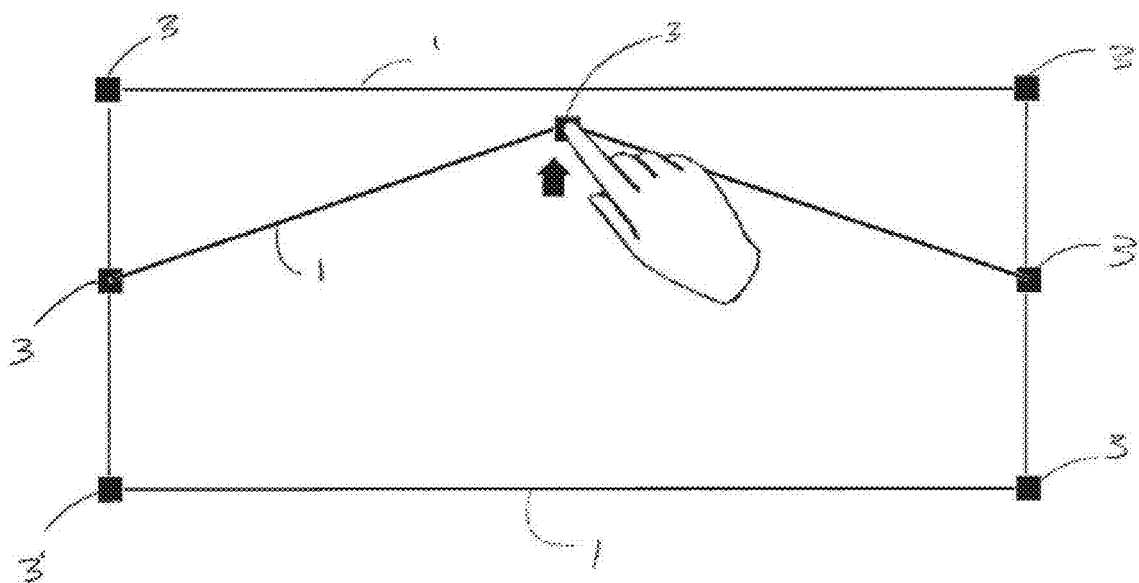
FIG. 9A is a schematic diagram of a gradient stack where a control point has been repositioned to create an angular offset effect.
Figure 9B:
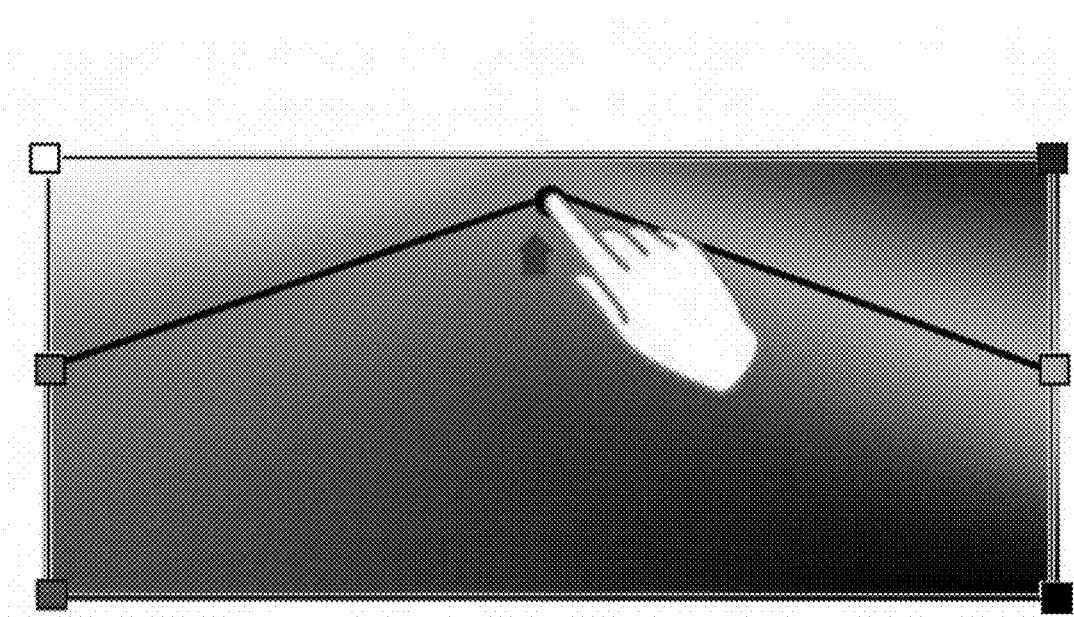
FIG. 9B is a color illustration of a rendered gradient field according to the gradient stack of FIG. 9A.
Figure 10A:
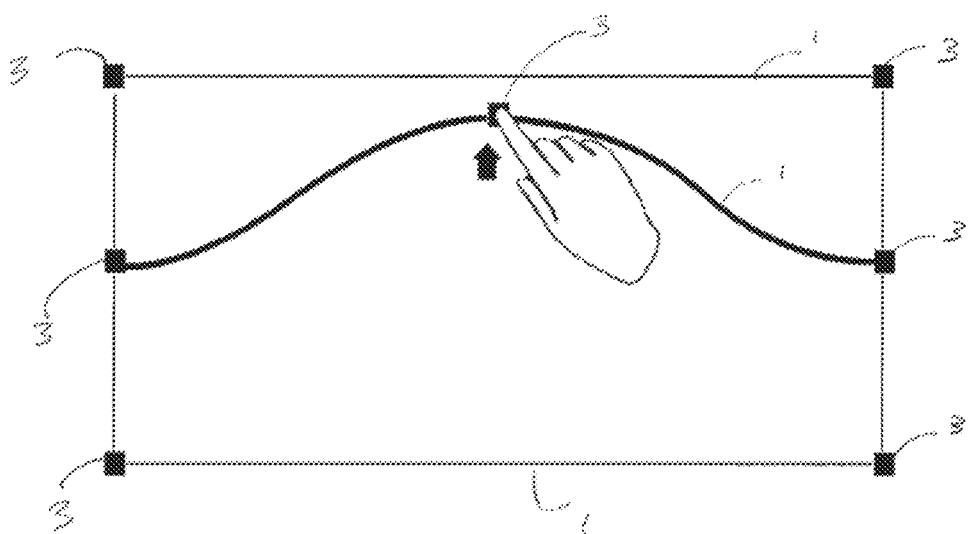
FIG. 10A is a schematic diagram of a gradient stack where a control point has been repositioned and a gradient path specified to create a curved offset effect.
Figure 10B:
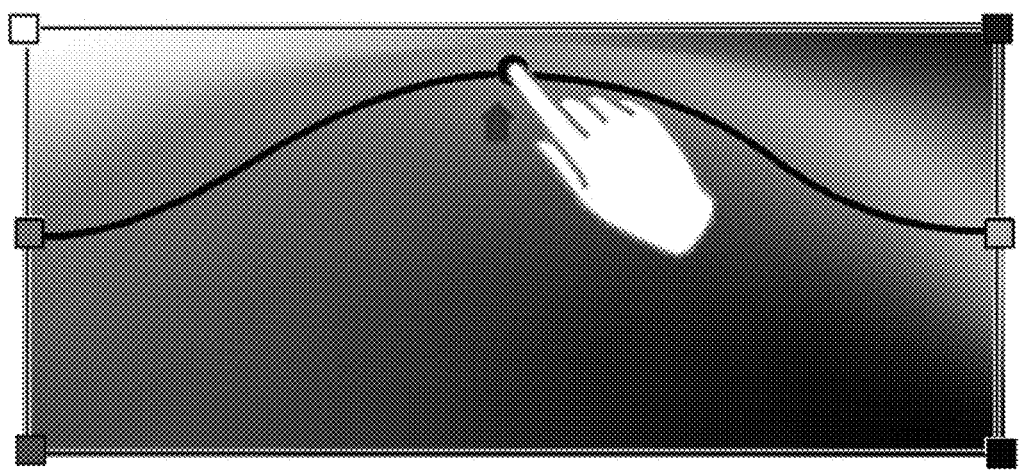
FIG. 10B is a color illustration of a rendered gradient field according to the gradient stack of FIG. 10A.

In FIGS. 8A-8B individual gradients that comprise the Gradient Stack may also extend to only a portion of m axis as shown by line segment/gradient path 5. As shown in FIGS. 9A-9B and 10A-10B, one embodiment of the disclosed subject matter may allow for vertical offsets to be applied to each control point 3, with various smoothing algorithms optionally applied.

Figure 11:
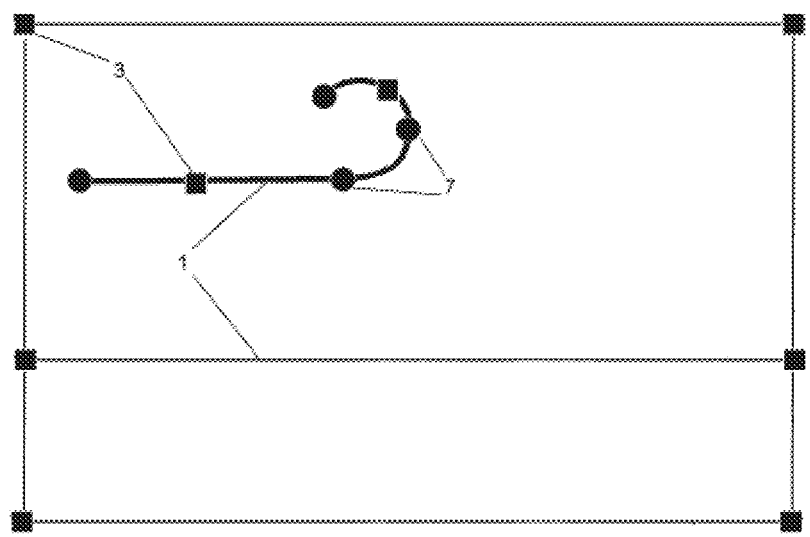
FIG. 11 is a schematic diagram of a gradient stack where a gradient path has been manipulated into a curve.
Figure 12A:
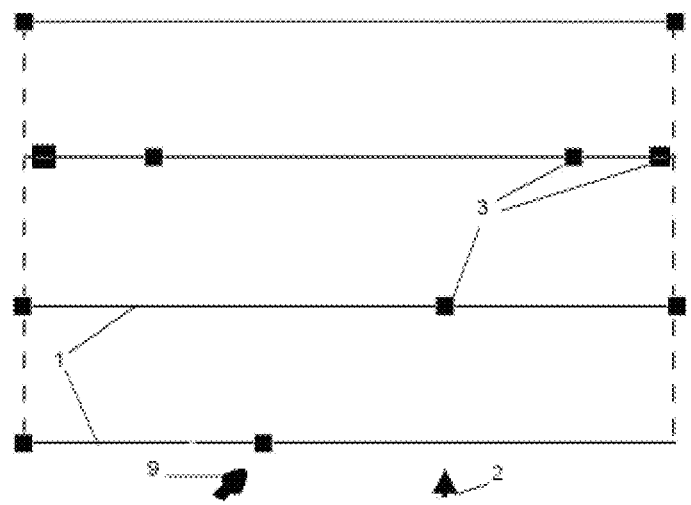
FIG. 12A is a schematic diagram of a gradient stack, similar to FIG. 6A, where one secondary path has been angled 45 degrees.
Figure 12B:
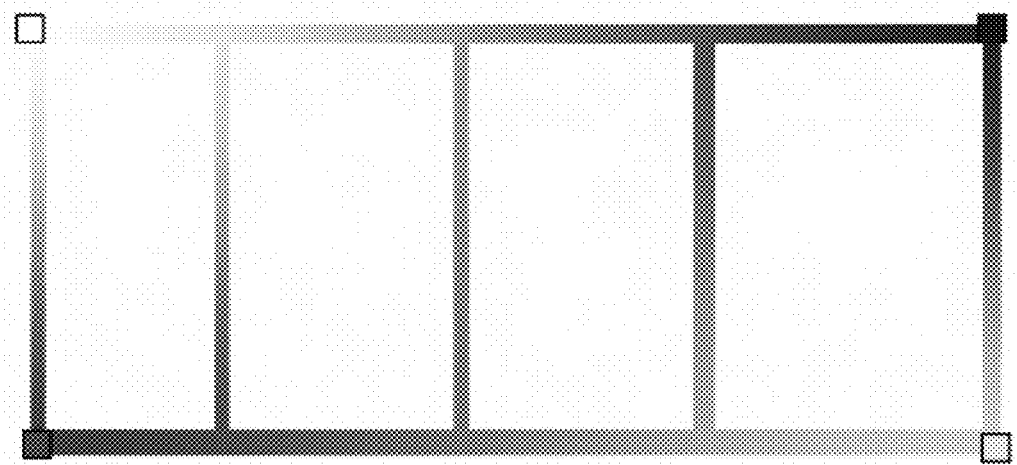
FIG. 12B is a color diagram illustrating a secondary path angled orthogonally as would be rendered according to the gradient stack of FIG. 6A.
Figure 12C:
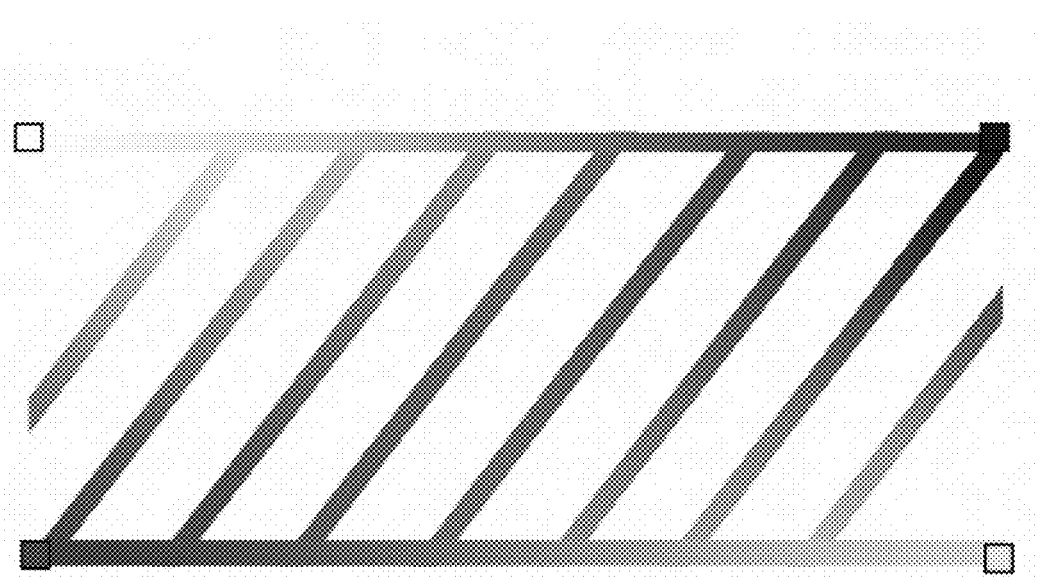
FIG. 12C is a color diagram illustrating a secondary path angled 45 degrees as would be rendered according to the gradient stack of FIG. 12A.
Figure 12D:
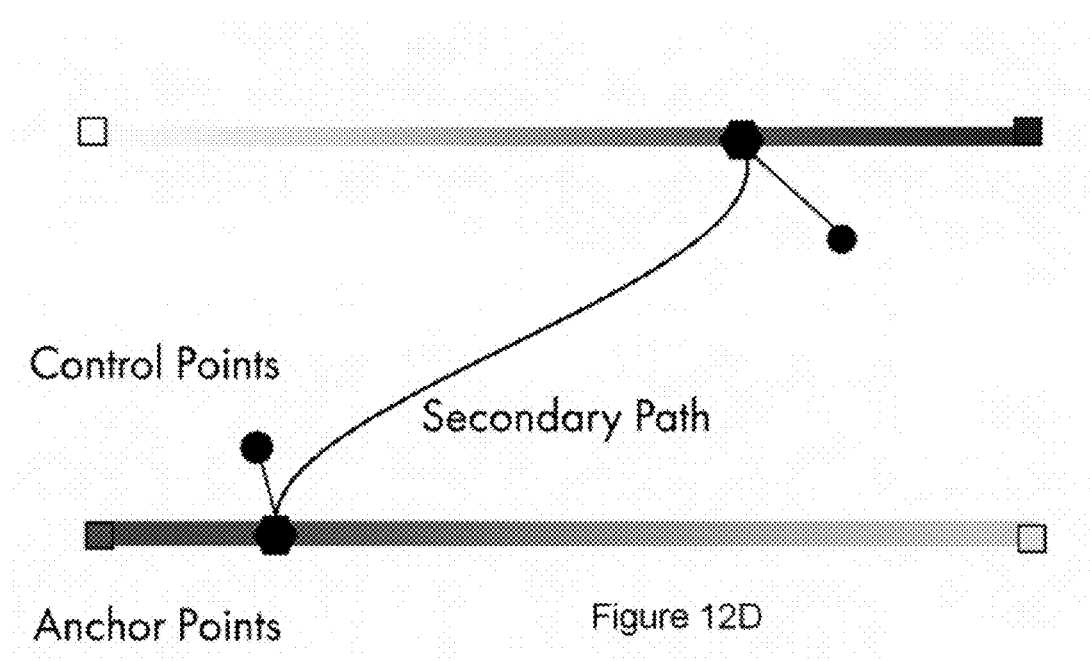
FIG. 12D is an illustration of an input method which would create a carved secondary path.

In FIG. 11, one embodiment of the disclosed subject matter allows for each entry (path) 1 within the gradient slack to define a complete curve, defined to part by independent sets of color control points 8 and curve control points 7.

In FIG. 12, one embodiment of the disclosed subject matter allows for the angle of the secondary path to be adjusted using common input controls for angles 9 in order to alter the Gradient Stack Effect.

One embodiment of the disclosed subject matter relates to a Gradient Stack Editor component which can allow the user to configure the individual color and opacity gradients, as well as configure the relationship between these individual gradients along the secondary path (line 2). One embodiment of the Gradient Stack Editor could leverage a two-dimensional rectangular space. In such an embodiment, one dimension (e.g. X) may be used to configure the relative spacing of the colors and opacity stops for the individual gradients along the primary path (line 1), while the other dimension (e.g. Y) being used to configure the relative spacing of these gradients along the secondary path (line 2). The inputs from the Gradient Stack Editor serve to create and/or manipulate a Gradient Stack Definition which can be used throughout the system.

Figure 13:
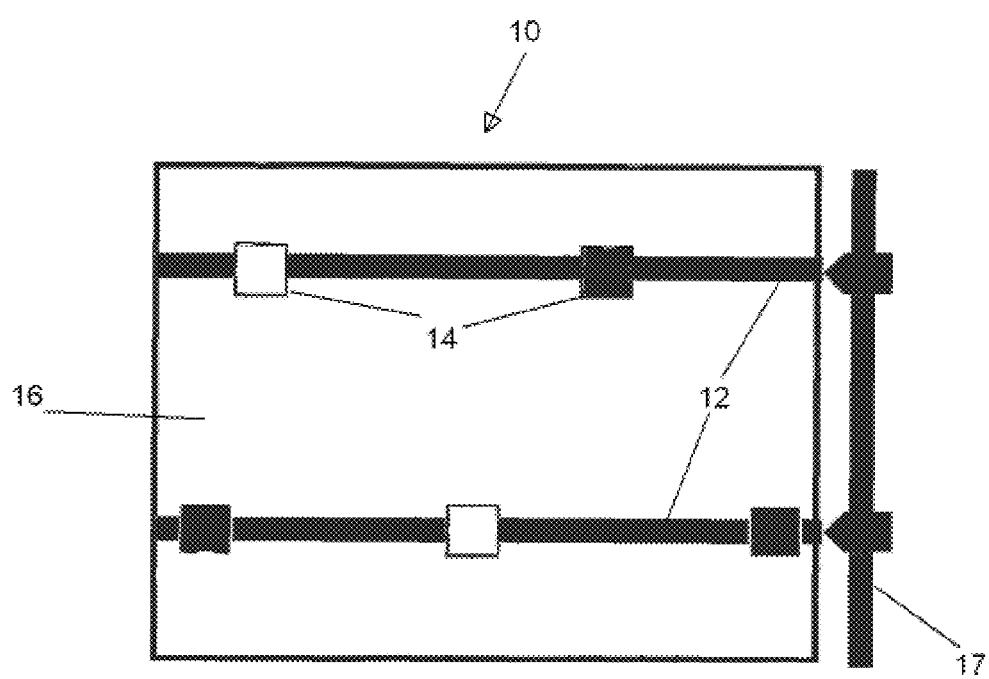
FIG. 13 is a schematic diagram of one embodiment of a gradient stack editor.

Referring now to FIG. 13, a sample embodiment illustrating the operation of a Gradient Stack Box is shown. In this embodiment, slider controls, such as Gradient Sliders 12 and/or Gradient Slider Thumbs 14, can be used to configure each Gradient within Gradient Stack 10. Offsets of individual color/opacity stops within a Gradient can be modified by dragging Gradient Slider Thumbs 14 or by using keyboard input left/right/up/down arrows). Contextual Details Panels (see FIGS. 16-18) may also be used to modify the stop offsets when one or more stops are selected. A new Gradient may be added to the Gradient Stack 10 by performing a tap/click gesture within Preview area 16, with the new Gradient automatically assigned an offset corresponding to the position of the gesture within the Preview area 16. Optional Offset Slider 17 may be used to move gradient paths upwards or downwards to vary the gradient effect.

Gradients may be removed from Gradient Stock 10 in several ways. For example, it is contemplated that a Remove gesture may be used, which comprises, for example, dragging Gradient Slider Thumb 14 off of Gradient Slider 12 track or dragging Gradient Slider 12 outside of Preview area 16. The Contextual Details Panels may also include a Remove action when one or more Gradients are selected. Alternatively, all of the stops on a Gradient can be removed to remove the Gradient from the Gradient Stack.

Another embodiment of the disclosed subject matter relates to a Gradient Stack Definition which can be a computer readable format which encapsulates the settings defined by the Gradient Stack Editor (see FIGS. 14 and 15) in order to sufficiently apply the Gradient Effect within a computer application. This definition includes, but is not limited to, one or more Gradient Definitions defining the individual gradients that compose the Gradient Stack. It also includes information such as the relative or absolute position of each of these individual Gradients along the secondary path. It may also include additional information that represents modifiers to be applied to an individual gradient, such as one that defines the brightness of an entire individual gradient to be increased by 10%. Additional metadata that does not pertain to the display of the Gradient may also be included, such as a name or author that should be associated with the Gradient Stack.

Still another embodiment of the disclosed subject matter relates to a Gradient Definition which can be a computer readable format which encapsulate the settings of a standard path gradient. This definition includes, but is not limited to, information such as the colors and opacities of the gradient and the relative or absolute position of said colors and opacities along the path. The colors and opacities defined by the Gradient Definition need not be encoded as raw, numeric values, but may instead be encoded as references to other entities, such as an ID of a color within a color palette. The Gradient Definition may also include details to define a more complex curve, such as secondary axis offsets for each control point or an entire set of curve control points.

Another embodiment of the disclosed subject matter relates to one or more Gradient Stack Renderers which may be used to render the Gradient Stack to a computer display. This may be for the purpose of providing a preview of what the effect will look like once applied, for applying the effect to a graphical document, for the rendering of the final Gradient Stack Effect within a computer application. The Gradient Stack Renderers may be comprised of one or more individual graphics subroutines which can take all or parts of the Gradient Stack Definition as inputs in order to render the appropriate color and opacity across an area.

Figure 14:
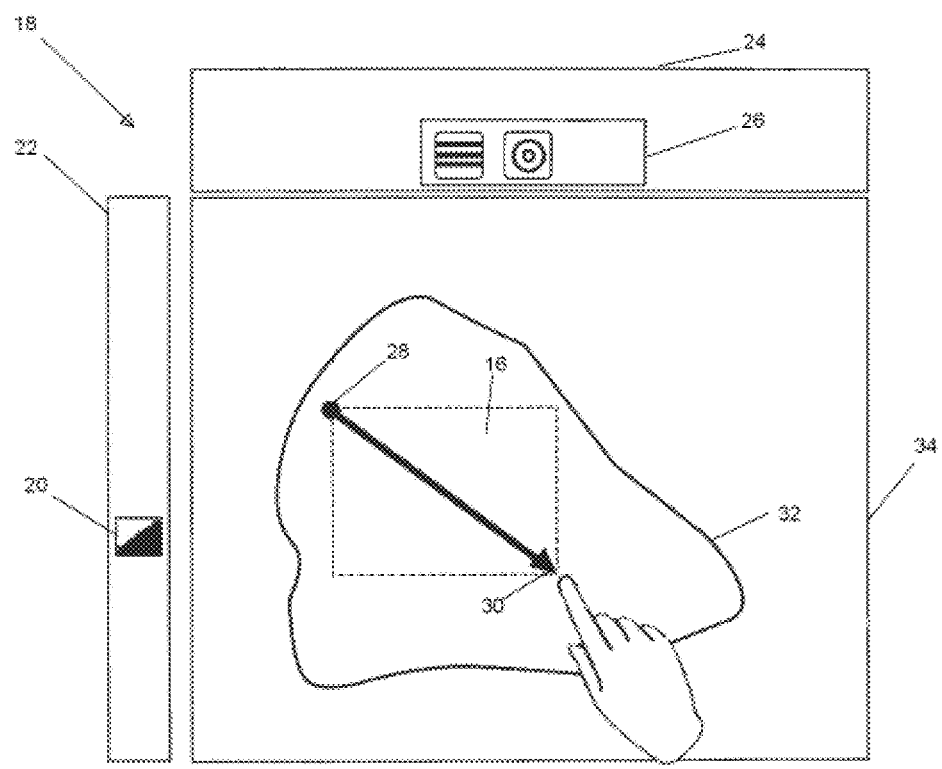
FIG. 14 is a schematic representation of one embodiment of a graphical user interface for a Gradient Stack Tool.

Further embodiments of the disclosed subject matter relate to a (Gradient Stack Tool component which allows application of a Gradient Stack as defined by the Gradient Definition to a graphical document or project. As shown in FIG. 14, Gradient Stack Tool 18 may be controlled by a user input device, such as a touch screen or computer mouse, to apply the gradient to a specific area of the graphical document as defined by the user inputs. Gradient Stack Tool 18 may also be used in combination with other tools within a graphics application, such as a Shape and/or Selection Tool, in order to define the area where the Gradient Stack Effect should be applied.

FIG. 14 demonstrates how one embodiment of Gradient Stack Tool 18 may be put to use within a graphic application. As a generic graphics application allow for a multitude of operations, there may be a need to activate Gradient Stack Tool 18 through user input such as choosing the tool via Tool Icon 20 from Tools Panel 22 or from other user menus within the generic graphics application. Once activated, a Properties Panel 24 is presumed to allow the Gradient Stack Effect to be configured.

The graphics application is configured to respond to user input to apply the Gradient Stack Effect. Properties Panel 24 provides a mechanism for configuring Gradient Stack 10, such as through Gradient Stack Tool 18. Mode selector 26 is exposed within Properties Panel 24, to allow a alternative whether the effect is applied along the X and Y axis or along specified radial or angular paths. Additional options are presented within Properties Panel 24 to allow for quick manipulations for applying the effect, such as reversing the order of the effect in the primary and/or secondary axis, along with more standard options, such as the overall opacity to apply the effect.

Figure 15:
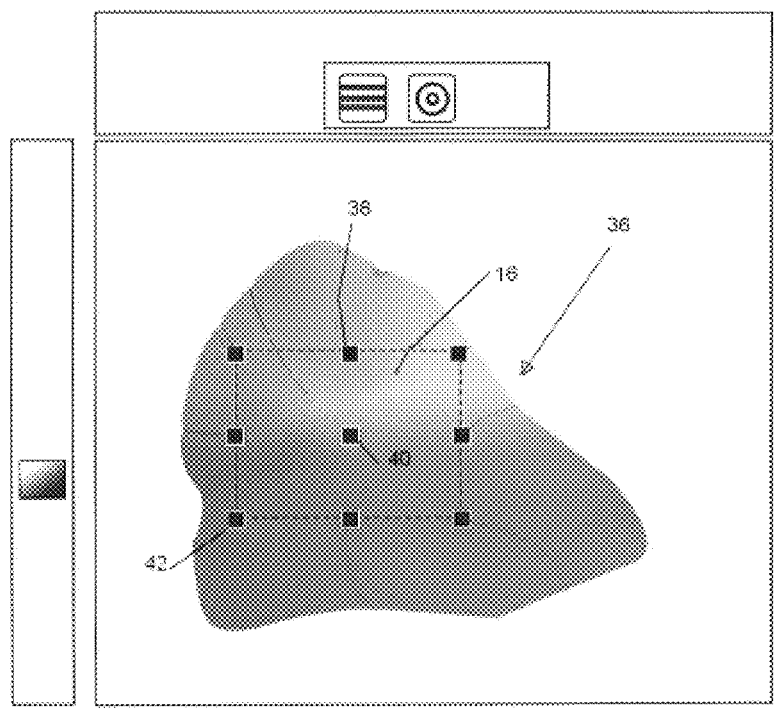
FIG. 15 is a schematic representation of one embodiment of a graphical user interlace for a Gradient Stack Tool.

FIGS. 14 and 15 demonstrate user interactions with one embodiment of the Gradient Stack Tool 18 after activation. A user may perform a drag event from start point 28 to end point 30 to define a preview area 16 on an element 32 in a document 34. While the drag event is being performed, a preview is rendered on the display to provide visual feedback as to how the effect will look once applied to the document. The preview may consist of a basic outline of the area or may more closely resemble the final effect, depending upon user preference and/or available computational capabilities of the system on which the graphics application is being run. Upon completion of the drag event (e/g/ lifting the finger off the screen, or releasing the mouse button), the effect can optionally be applied using the area defined by the start and end points, 28 and 30, respectively.

Once a Gradient Stack Effect has been applied, Gradient Stack Modifier 36 is available to make modification to the effect, such as the one shown in FIG. 14. Preview area 16 can be modified by dragging Resize Handles 38 that define the bounds of preview area 16. The preview area may also be moved by dragging Move Handle 40. Rotation may be applied by performing drag operations on Rotation Handles 42, such as those that may exist at the corners of the preview area 16. Gradient Stack Modifier 38 provides user feedback as to the actions that may be performed by modifying the mouse cursor while the mouse is positioned over the Handles 40, 42 described. Gradient Stack Modifier 36 also leverages a Gradient Stack Editor to allow in-line modifications to the effect without the seed to re-launch the Gradient Stack Editor and re-apply the effect using the Gradient Stack Tool 18.

Figure 16:
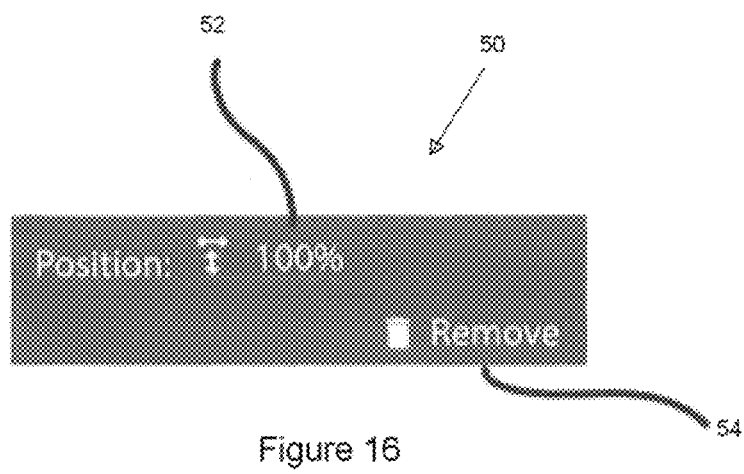
FIG. 16 is a schematic representation of one embodiment of a Line Details Sub-Panel of a Contextual Details Panel.

FIG. 16 illustrates a Line Details Sub-Panel of the Contextual Details Panel which is used to modify Gradient stop offsets. Line Details Sub-Panel 50 includes Line Offset Tool 52 and Stop Removal Button 54. Stop Removal Button 54 is used to remove any selected Gradient stop offsets. Line Offset Tool 52 is used for adjusting the positioning of a Gradient Slider in a Gradient Stack Box (FIG. 8A).

Figure 17:
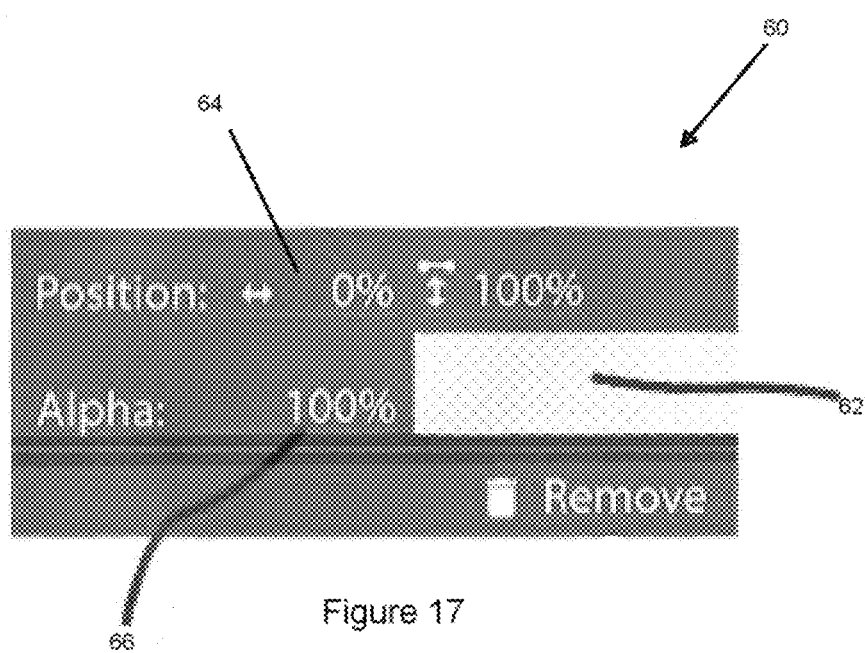
FIG. 17 is a schematic representation of one embodiment of an Capacity Stop Details Sub-Panel of a Contextual Details Panel.

FIG. 17 illustrates an Opacity Stop Details Sub-Panel of the Contextual Details Panel Opacity Stop Details Sub-Panel 60 includes Opacity Preview Panel 62, Line Offset Tool 52, Stop offset Tool 64, Opacity input Tool 66 and Stop Removal Button 54. Line Offset Tool 52 and Stop Removal Button 54 operated in a similar manner to the corresponding tools in Line Details Sub-Panel of FIG. 16. Opacity Preview Panel 62 is used to preview current opacity of a selected Gradient. Stop Offset Tool 64 is used to adjust the position of any selected offset stops along a Gradient. Opacity input Tool 66 is used to adjust the amount of opacity of a Gradient.

Figure 18:
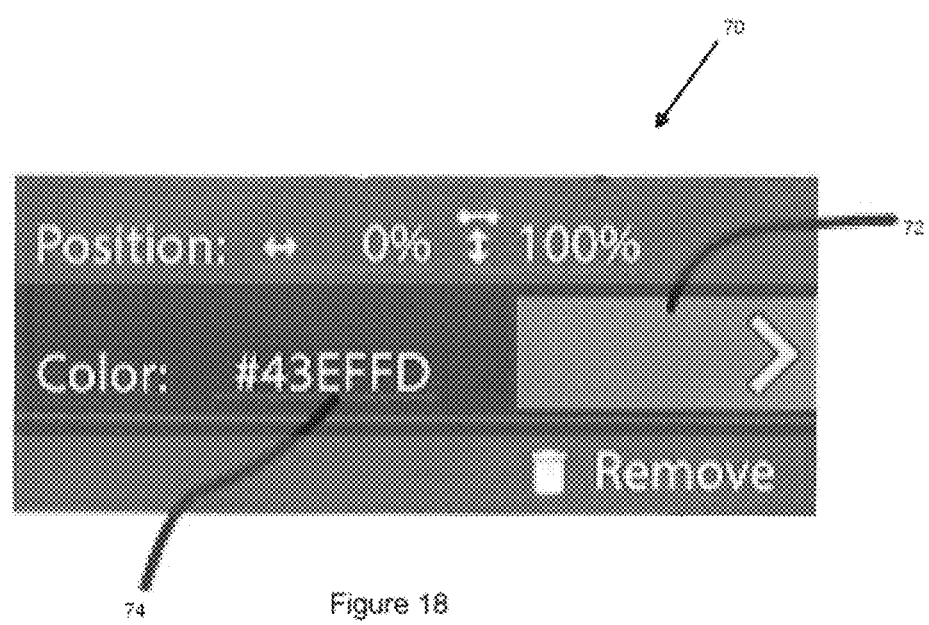
FIG. 18 is a schematic representation of one embodiment of a Color Stop Details Sub-Panel of a Contextual Details Panel.

FIG. 18 illustrates a Color Stop Details Sub-Panel of the Contextual Details Panel. Color Stop Details Sub-Panel 70 includes Color Preview/Color Picker Tool 72, Line Offset Tool 52, Stop Offset Tool 64, Color input Tool 74 and a Stop Removal Button. Line Offset Tool 52, Stop Offset Tool 64, and the Stop Removal Button operate in a manner similar to the corresponding tools in the Line Details Sub-panel of FIG. 16 and the Opacity Stop Details Sub-Panel of FIG. 17. Color Preview/Color Picker Tool 72 is used to select the color associated with a selected offset stop or control point and to provide a preview of the selected color. Color input Tool 74 is also used to adjust the shade of the selected color.

Figure 19:
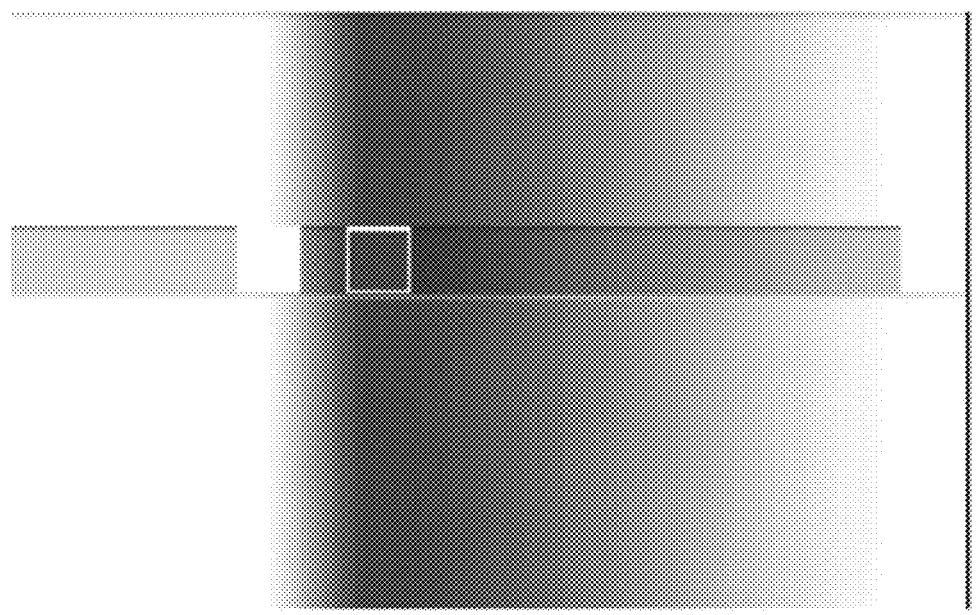
FIG. 19 is a schematic illustration of the effect of rendering control points in close proximity.

FIG. 19 is an illustration of the effect of rendering control points in close proximity according to the disclosed gradient modeler. As an example, a blue control point will not have a fixed affect on the output, but is instead based on the distance (and color) of the adjacent control points. If the next control point (e.g. white) is close, only a small area will be blue. If the same white control point is far away, the blue will extend much further into the field. It may thus be appreciated how the effect of the blue control point is very dependent on the distance to the control points around it (even asymmetrically) and only in one dimension (horizontally) vs. pure distance from the control point.

Figure 20:
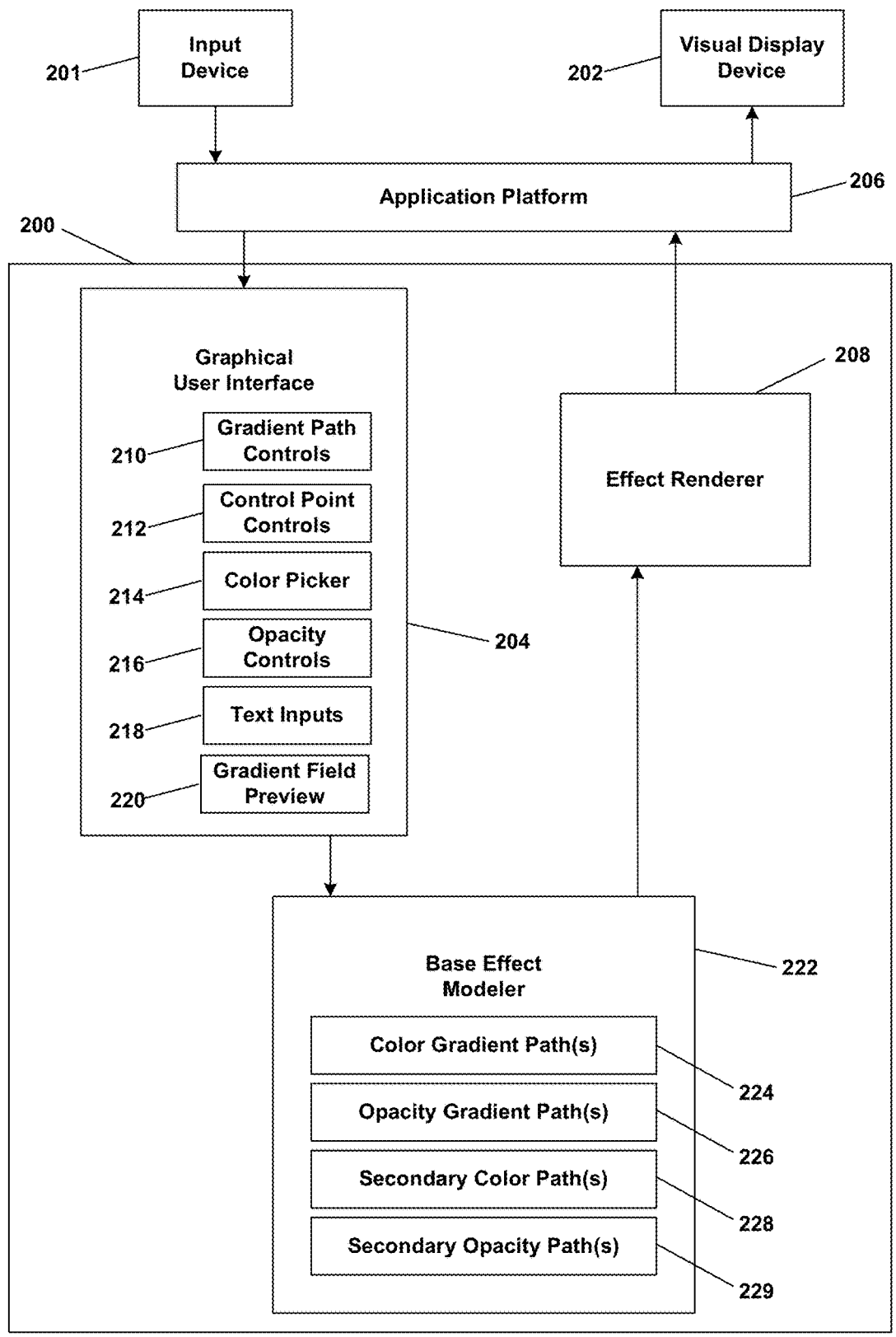
FIG. 20 is a schematic block diagram of one embodiment of a system for the creation and use of a of a gradient field.

FIG. 20 is a schematic block diagram of one embodiment of a gradient effect modeler 200 for rendering a color gradient field in operative connection to a graphic design or image editing application platform 206. It should be noted that parts of the system may be operated over multiple computing devices, in some cases across a distributed network, such as the Internet, or it may be operated within a single computing device, such as the device schematically illustrated in FIG. 25. Conventional subscription/Internet modalities may also be employed, as will be appreciated by those skilled in the art.

Input is received via an operatively connected computing device or any input device 201 capable of receiving and communicating data. Such input devices may be conventional input devices, such as a touch screen, mouse pad, track ball, keyboard, etc., as well as by interaction with a virtual reality (VR) environment, voice command, biometric feedback, or other input source.

Input from input device 201 is received by application platform which is operatively connected to graphical user interface 204 displaying various gradient path and control point tools.

Gradient path controls 210, for example, would advantageously include a graphical interface for creating, repositioning, and removing gradient paths within the gradient field being created, in addition to more sophisticated tools for curving a gradient path, setting secondary path parameters for a gradient path and applying attributes to the entirety of control points associated with a particular gradient path. Control point controls 212 would advantageously be used for creating, repositioning, and removing control points 3, and setting or editing various control point attributes. A color picker 214 is an optimal tool for setting the hue, saturation, and brightness (HSB) of the colors to be blended across the gradient field, and assigning them to the individual control points. Preferably, the gradient field tools include opacity controls 216 which determine the transparency of the various colors across the gradient field and may create opacity stops capable of operating separately from control points 3, or in combination.

Graphical user interface 204 includes various text-based input controls 218, such as those that are illustrated in FIGS. 16, 17 and 18, where various parameters may be input, such as color hex codes, gradient path or control, point position, or opacity percentages as text. Optimally, graphical user interface 204 includes a gradient field preview display 220 (such as preview area 16 illustrated in FIG. 14) so that effects that are being created with the control tool inputs may be immediately, even instantaneously, or simultaneously, viewed.

Data is communicated from graphical user interface 204 to base effect modeler advantageously in the form of a gradient stack. Components within base effect modeler 222 calculate the gradient effect and create the gradient field. For example color gradient path component 224 calculates the color assignments for each point to be rendered along the gradient path(s), using a calculation method based upon the relative proximity of the color stops or color control points 3 to one another along each gradient path 1. Similarly, opacity gradient path component 226 calculates the opacity assignment for each point based upon the relative proximity of the opacity stops or opacity control points. To blend the colors and opacities throughout the gradient field, a secondary color path component 228 and a secondary opacity path component 229 are used. (See the discussion of FIGS. 12A-12D above.)

The gradient field data is then sent to effect renderer 208 which renders the gradient field data into a data form compatible with the graphic design or image editing application platform 206, such that the application platform 206 can use the gradient field data for display through a visual display device 202. Such a device may be a conventional computer video display such as a monitor, laptop computer screen, handheld device or cell phone screen, and the like now known or later developed, as well as a virtual reality headset, interactive touch screen, or the like.

Optimally, the gradient field data is rendered by effect renderer 208 in such a way that the data may be used by application platform 206 to place the gradient field over specific objects within the image being created. For example, the color gradient field may be positioned and cropped to fit a two-dimensional space of particular boundaries and particular layer within the image such that it creates, for example, a sunset within the picture. In another example, the gradient field may wrapped around a three-dimensional object within the image, for example, to create a ripening apple effect.

Figure 21:
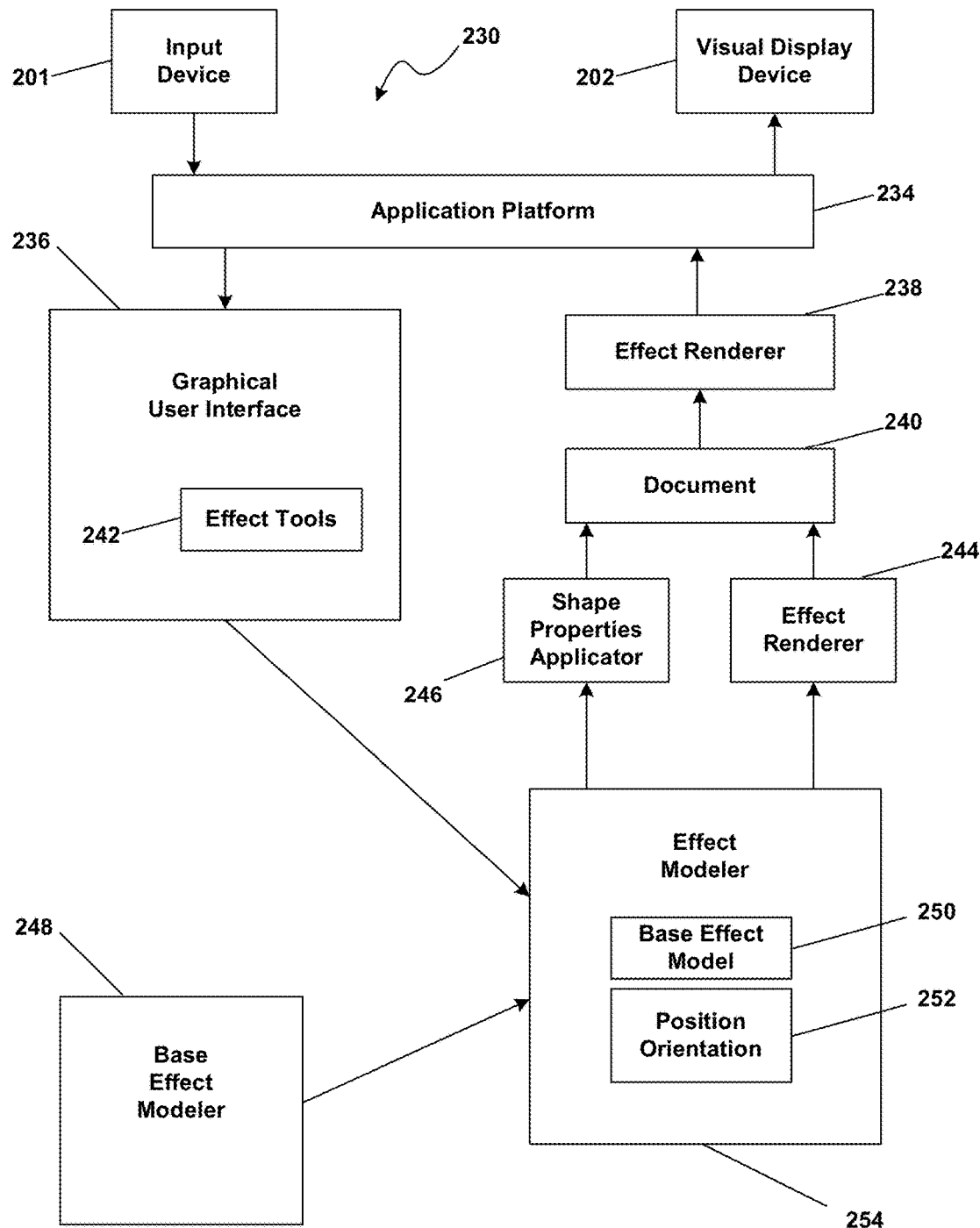
FIG. 21 is a schematic block diagram of another embodiment of a system for the creation and use of a gradient field.

FIG. 21 is a schematic block diagram of another embodiment of a system in accord with the disclosures of this application. System 230 is also used for rendering a color gradient field in operative connection to a graphic design or image editing application platform 206. Again, it should be noted that parts of the system may be operated over multiple computing devices, in some cases across a distributed network, such as the Internet, or it may be operated within a single computing device.

Similar to the system of FIG. 20, the embodiment of FIG. 21 receives input from input device 201 which is communicated to graphic design or image editing application platform 284. In this embodiment, the components of system 230 are more fully integrated into the workings of the application platform, resulting in a more seamless editing experience for a user.

Graphics data that communicates the gradient stack is sent by gradient field creation tool (also advantageously a graphical user interface GUI) 236 to effect modeler 254. GUI 236 also contains effect tools 242 specific to use within application platform 234. Optimally, effect modeler 254 also receives data from a base effect modeler 248. Effect modeler 254 uses the gradient stack data in combination with base elect model 250 and position orientation 252 to create a data load that is sent as appropriate to shape properties applicator 246 and effect renderer 244, respectively.

Shape properties applicator 246 and effect renderer 244 combine operations to apply the gradient field over the shapes or objects within the image, and as a result a communicative programming document 240 is created. Document 240 is then sent to a second effect renderer 238. Renderer 238 is operatively interfaced with application platform 234. That is, effect renderer 238 is a component capable of rendering graphic data in a format usable by the application platform 234 to create the desired graphic display. Application platform 234 then sends the display to the visual display device 202, and an image which incorporates a gradient field, placed in the desired position and shaped to the appropriate dimensions, is displayed.

It may be noted that there are both an effect renderer 288 and an effect renderer 244 for producing graphics data in one of two places. Once is at the moment that the tools is applied to apply the gradient. In this scenario, the graphics data remains static. The other renderer is for whenever the document is to be rendered. This is a more dynamic scenario which allows for the effect to adjust either (a) automatically based on the object to which it is applied (such as when the shape which has the effect applied is resized), or b) manually based on subsequent input (such when a color of the base effect is changed. In this case, the effect does not need to be re-applied.

Note that use of the term 'tool' herein refers to the element and systems that apply the effect to the project or document. A tool would include the elements necessary to receive the user's input (such as start and end points) and determine the size/position of the effect to be created in the document. 'Editor refers herein to the pieces that make up the effect generically. Such allowing a user to define that they want an effect from black to white. The tool would then take that effect (or one created earlier) and apply that to a specific area/object of the document.

Figure 22:
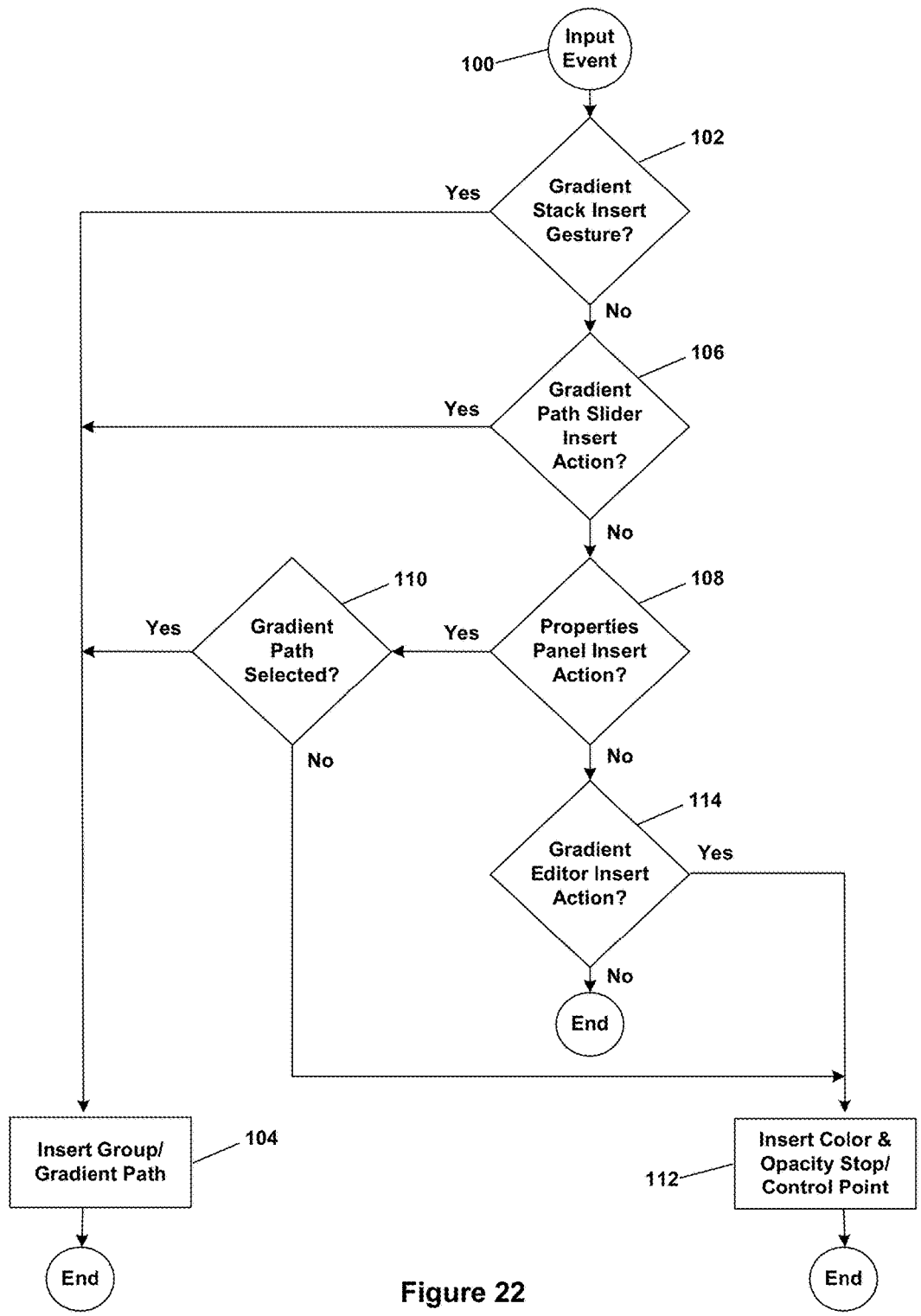
FIG. 22 is a flowchart of a method for creation of certain parts used in the creation of a color gradient field.

FIG. 22 is a flowchart of one embodiment of a method for inserting color/opacity stops, such as control points 3, or groups of color and opacity stops, such as gradient paths 1. The method is advantageously initiated by input event 100 (potentially a user input from input device 201). The method then checks whether input event 100 is a Gradient Stack Insert Gesture at decision point 102. If input event 100 is Gradient Stack Insert Gesture 102, then process 104 is performed to insert a group of color/opacity stops, potentially as a Gradient Slider or as Gradient Path 1.

If input even 100 is not a Gradient Stack Insert Gesture, the method checks whether input even 100 is Gradient Path Slider Insert Action 106. If input event 100 is a Gradient Path Slider Insertion Action, then the method inserts a group of stops as Gradient Path Slider Thumbs as part of process 104. If the input event is not Group Offset Slider Insert Action 106, the method checks whether the input event is a Properties Panel Insert Action 108. If the input event is a Properties Panel Insert Action, the method checks at decision point 110 whether a group of color/opacity stops or a gradient path is selected. If a such group is selected, then process 101 is performed, inserting a group of color/opacity stops as a Gradient Slider or Gradient Path 1. If a group of offsets is not selected, the method performs action 112, inserting a color and opacity slop/control point.

If the method determines at decision point 108 that input event 100 is not a Properties Panel Insert Action, the method checks whether the input event is a Gradient Editor Insert Action 114. If the input event is a Gradient Editor Insert Action, the method performs action 112, inserting a color and or opacity stop/control point.

Figure 23:
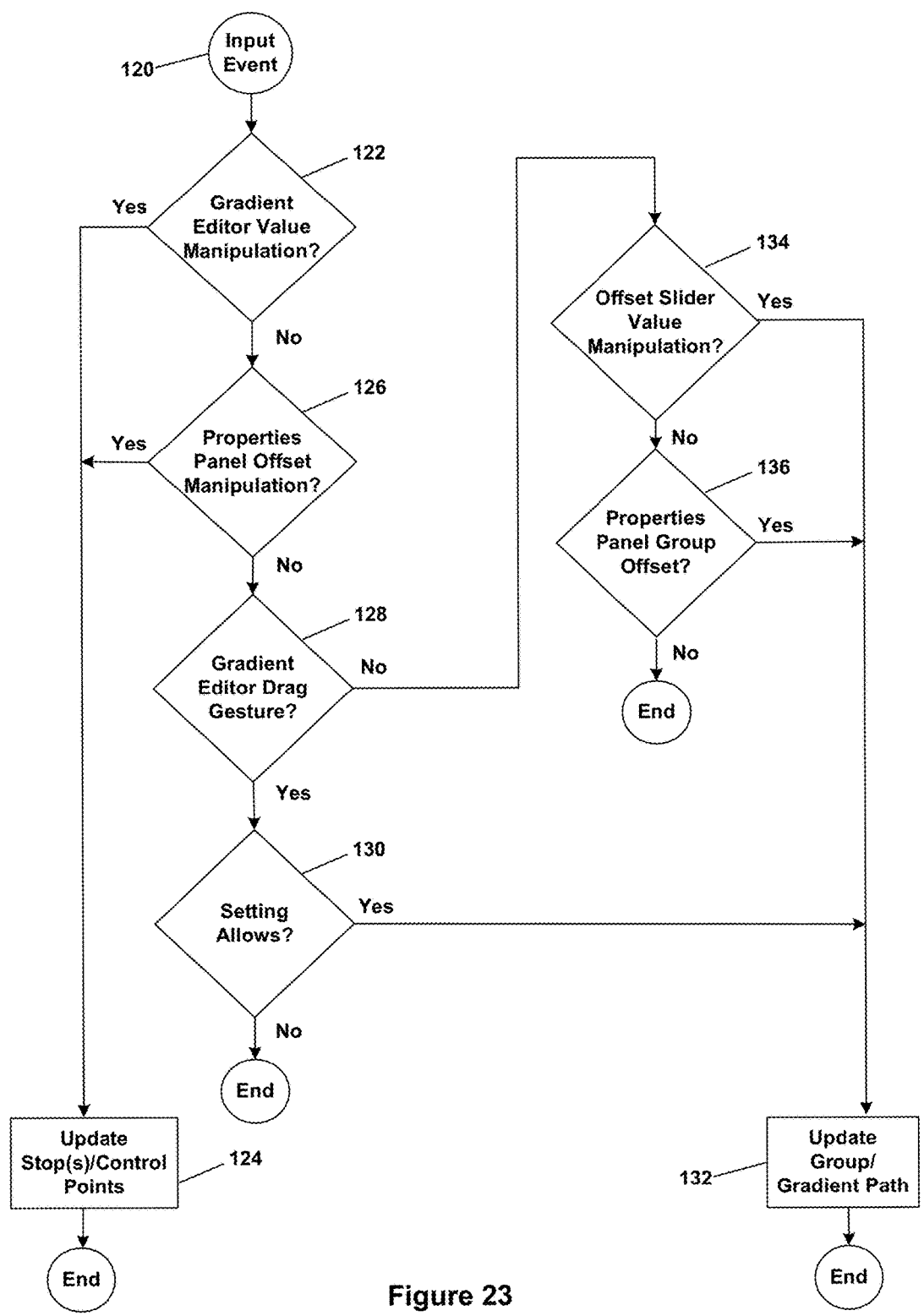
FIG. 23 is a flowchart of a method for editing certain parts used in the creation of a color gradient field.

FIG. 23 is a flowchart of one embodiment of a method for updating positions and attributes of color and or opacity stops/control points or groups of color and opacity stops/gradient paths. The method may advantageously be initiated by input event 130. The method then checks whether the input event is a Gradient Editor Value Manipulation action at decision point 122. If the input event is a Gradient Editor Value Manipulation action, then the method performs action 124, updating the selected color and or opacity stop(s)/control points, using the data from the input event.

If input event 120 is not a Gradient Editor Value Manipulation Action, then the method determines if the input event is a Properties Panel Offset Manipulation action at decision point 126. If the input event is a Properties Panel Offset Manipulation action, then the method performs action 124, updating the selected color and opacity stop(s)/control point (s) using the data from the input event.

If input even 120 is not a Properties Panel Offset Manipulation Action, then the method determines if the input event is a Gradient Editor Drag Gesture 128. If the input event is a Gradient Editor Drag Gesture, then the method determines whether either user or hardcoded settings allow the action at decision point 130. If the settings allow the action, then the method performs action 132, updating the selected group of color and or opacity stop(s)/gradient path(s) using the data from the input event. If the settings to not allow the action at decision point 130, then the method returns to waiting for another input event 120.

If, at decision point 128, the method determines that input event 120 is not a Gradient Editor Drag Gesture, then the method determines if the input event is an Offset Slider Value Manipulation 134. If the input event is an Offset Slider Value Manipulation, then the method performs action 132, updating the selected group of color and opacity stop(s)/gradient path(s) using the data from the input event.

If input event 120 is not an Offset Slider Value Manipulation, then the method determines if the input event is a Properties Panel Group Offset Manipulation 138. It the input event is a Properties Panel Group Offset Manipulation, then the method performs action 132, updating the selected group of color and opacity stop(s) or gradient path(s), using the data from the input event.

Figure 24:
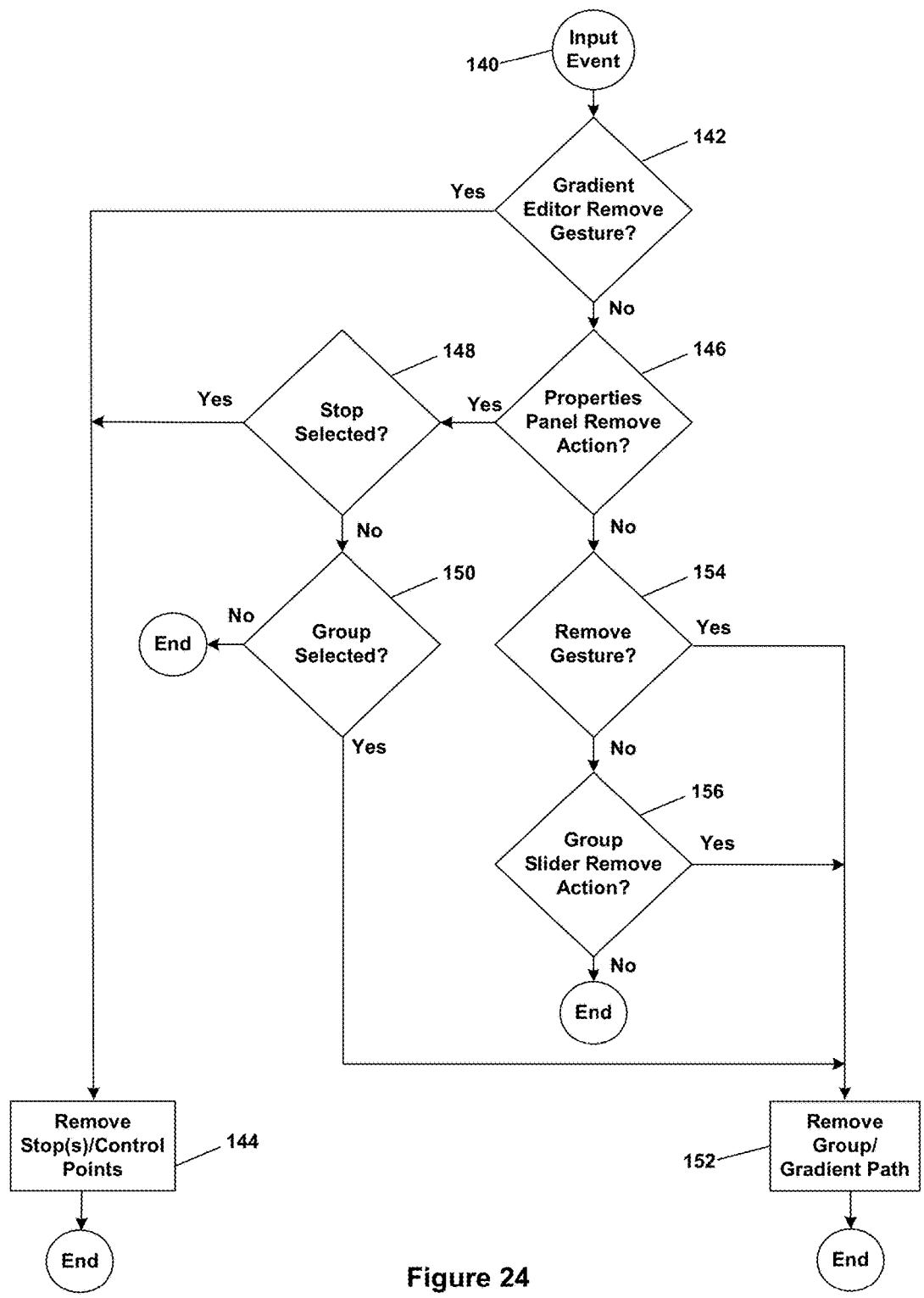
FIG. 24 is a flowchart of a method for removing certain parts used in the creation of a color gradient field.

FIG. 24 is a flowchart of one embodiment of a method for removing color and opacity stops/control points and groups of color and opacity stops/gradient paths. The method may advantageously be initiated by input event 140. The method then checks whether the input event is a Gradient Editor Remove Action 142. If so, the method performs action 144, removing the selected color and opacity stop(s) or control point(s) using the data from the input event.

If the input event is not a Gradient Editor Remove Action, then the method determines if the input event is a Properties Panel Remove Action 146. If so the method determines if a stop(s) or control point is selected at decision point 148. If a stop(s) is selected, then the method performs action 144, removing the selected color and opacity slope(s) or control point(s), using the data from the input event. If the method determines that a stop(s) is not selected, the method determines if a group is selected at decision point 150. If a group is selected, then the method performs action 152, removing the selected group of color and opacity stop(s) or gradient path(s), using the data from the input event. If a group is not selected, the method returns to waiting for another input event at 140.

If, at decision point 146, the method determines that the input event is not a Properties Panel Remove Action, the method determines if the input event 140 is a Remove Gesture 154. If so the method performs action 152, removing the selected group of color and opacity stop(s) or gradient path(s), using the data front the input event.

If input event 140 is not a Remove Gesture, the method determines if the input event is a Group Slider Remove Action 156. If so the method performs action removing the selected group of color and opacity stop(s) or gradient path(s), using the data from the input event.

Figure 25:
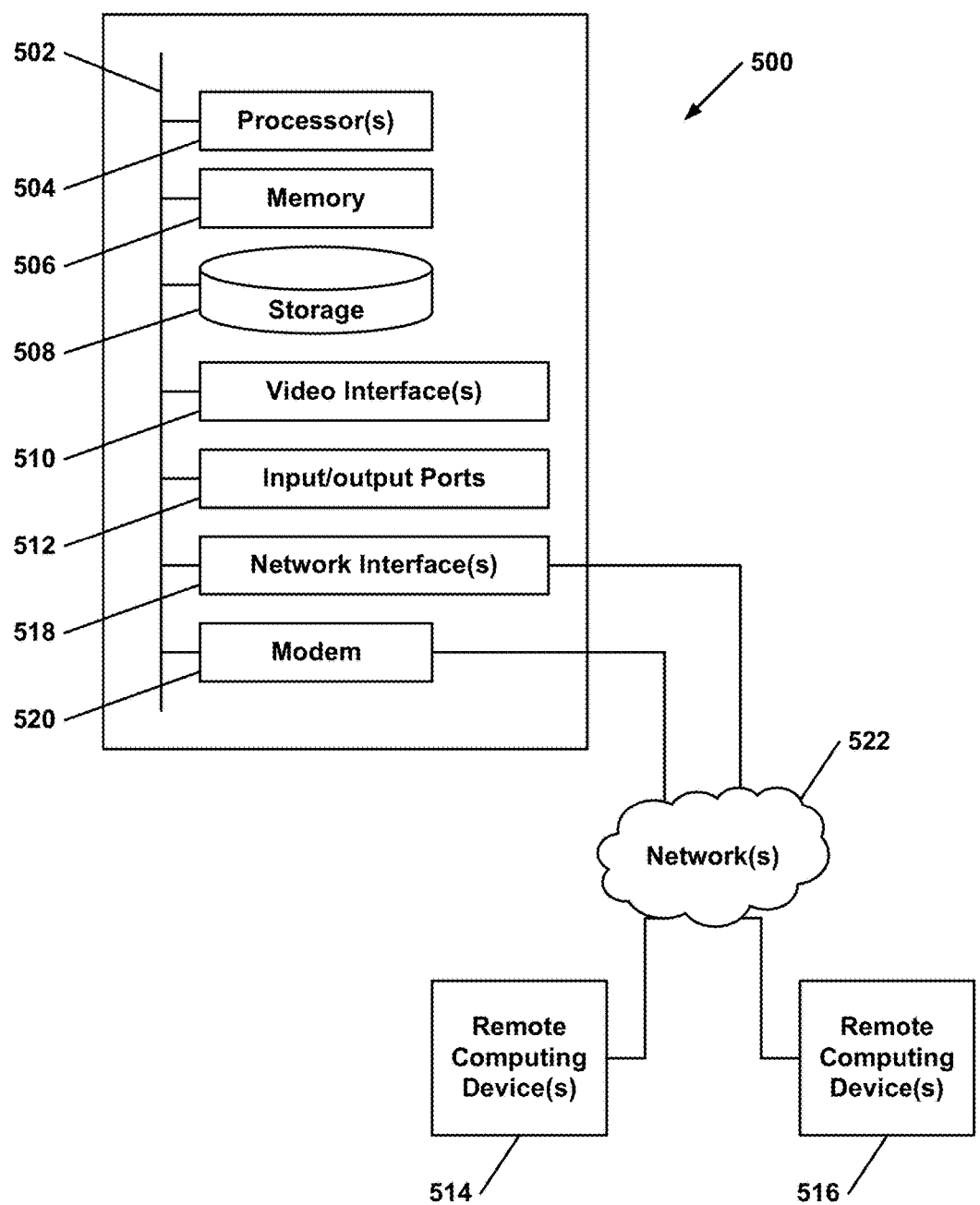
FIG. 25 is a schematic block diagram of a suitable computing environment in which certain aspects of the system and method may be implemented.

FIG. 25 and the following discussion are intended to provide a brief, general description of a suitable environment in which certain aspects of the illustrated disclosed subject matter may be implemented. As used herein, the terms "computer" and "computing device" are intended to broadly encompass a single machine, or a system of communicatively coupled or interfaced machines or devices operating together. Exemplary machines include computing devices such as personal computers, workstations, servers, portable computers, handheld devices, cell phones, virtual reality computing devices, and the like.

Typically, the environment includes computer 500 that includes system bus 502 to which is attached one or more single or multiple-core processors 504, memory 506, that is, random access memory (RAM), read-only memory (ROM), or other state preserving medium storage devices 508, video interface 510, and input/output interface ports 512. The computer may be controlled, at least in part, by input from conventional input devices, such as a keyboard, mouse, trackball, touchscreen, and the like, as well as by directives received from another machine, interaction with a virtual reality environment, biometric feedback, wireless signaling device, or other input sources familiar to those skilled in the art.

The computer may include embedded controllers, such as programmable or non-programmable logic devices or arrays, application specific integrated circuits, embedded computers, smart cards, and the like. The computer may utilize one or more connections to one or more remote computers 514, 516, such as through network interface 518, modem 520, or other communicative coupling. Computers may be interconnected by way of physical and/or logical network 522, such as an intranet, the Internet, local area networks, and wide area networks. Persons skilled in the art will appreciate that communication with network 522 may utilize various wired anchor wireless short range or long range carriers and protocols, including radio frequency (RF), satellite, microwave, Bluetooth, optical, infrared, cable, laser, and the like.

Disclosed subject matter may be described by reference to or in conjunction with associated data sack as functions, procedures, data structures, application programs, etc. which when accessed by a computer results in the computer perforating tasks or defining abstract data types or low-level hardware contexts. Associated data may be stored in, for example, volatile and/or non-volatile memory 506, or in storage devices 508 and/or associated storage media, including conventional hard-drives, optical storage, tapes, flash memory, memory sticks, digital video disks and the like, as well as more exotic media such as computer-accessible biological state preserving storage. Associated data may be delivered over transmission environments, including network 522, in the form of packets, serial data, parallel data, propagated signals, and the like, and may be used in a compressed or encrypted format. Associated data may be used in a distributed environment, and stored locally and/or remotely for access in single or multi-processor computers.

Figure 26:
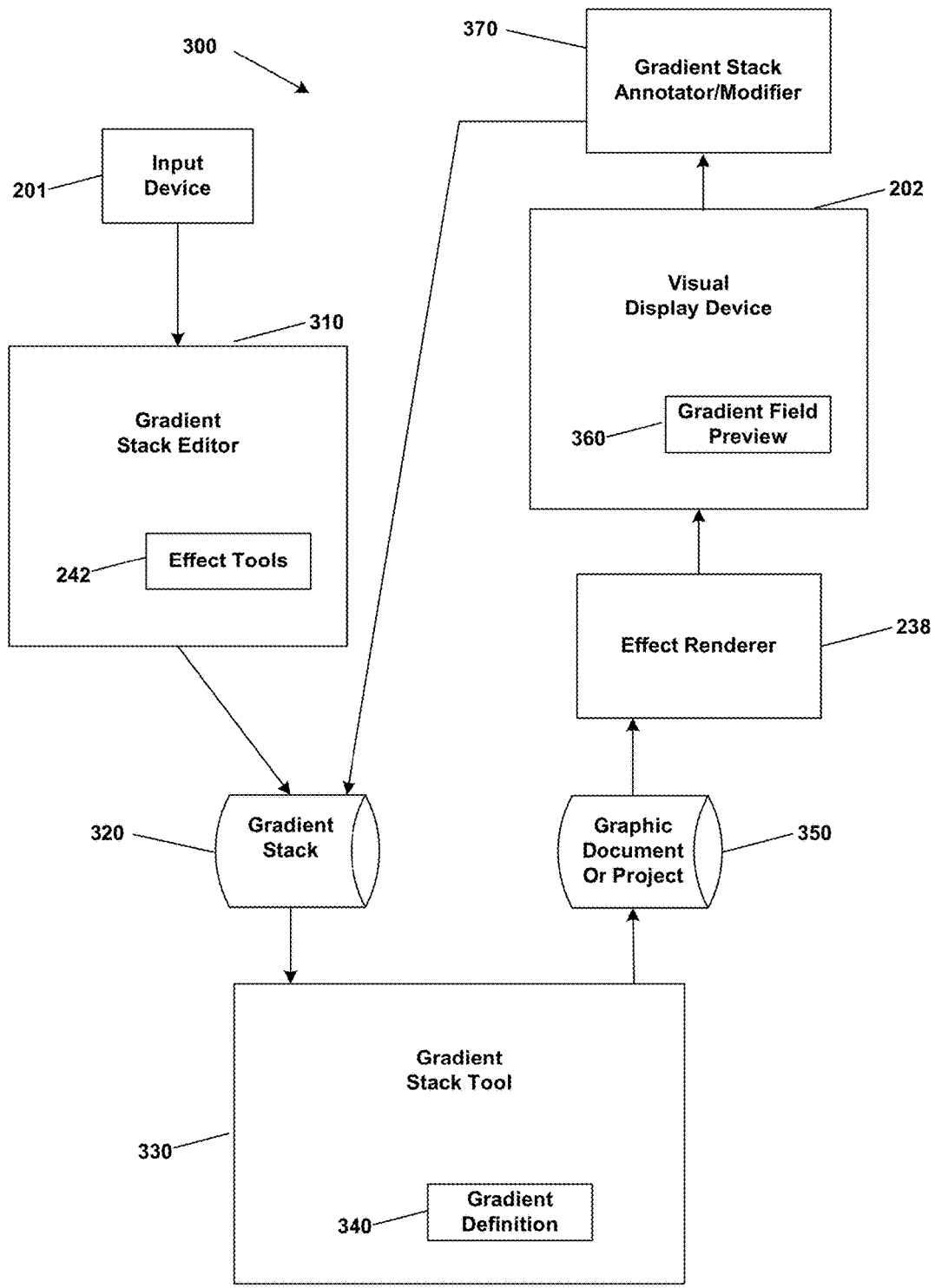
FIG. 26 is a schematic block diagram of one embodiment of a system for the creation and use of a gradient field.

FIG. 26 is a schematic block diagram of another embodiment of a gradient effect modeling system 300 for rendering a color gradient field. Gradient Stack Editor 310 receives input events from input device 201 as described above. Gradient Stack Editor 310 contains effect tools 242 as described above which are used to manipulate the positions and attributes of each gradient path and control point within the gradient field, advantageously among other effect attributes. The positions and attributes necessary for rendering the gradient field are all stored in Gradient Stack data structure 320. Gradient Stack 320 is sent to the Gradient Stack Tool 330, which combines Gradient Stack 320 with a Gradient Definition 340 to produce a graphic document or project 350. Graphic document 350 is used by Effect Renderer 238. Effect Renderer 238 then sends graphics data in a format usable by a Visual Display Device 202 to render a Gradient Field Preview 360. Gradient Stack Annotator or Modifier 370 may be used to modify Gradient Stack 320 without having to launch Gradient Stack Editor 310.

With regard to systems and components above referred to, but not otherwise specified or described in detail herein, the workings and specifications of such systems and components and the manner in which they may be made or assembled or used, both cooperatively with each other and with the other elements of the apparatus, system and methods described herein to effect the purposes herein disclosed, are all believed to be well within the knowledge of those skilled in the art. No concerted attempt to repeat here what is generally known to the artisan has therefore been made.

In compliance with the statute, the disclosed subject matter has been described in language more or less specific as to structural features. It is to be understood, however, that disclosed subject matter is not limited to the specific features shown, since the means and construction shown comprise preferred forms of putting disclosed subject matter into effect. Disclosed subject matter is, therefore, claimed in any of its forms or modifications within the legitimate and valid scope of the appended claims, appropriately interpreted in accordance with the doctrine of equivalents.

I claim:

1. A system for creating and rendering a color gradient field, the system comprising:
   a computer input device;
   a tangible computer-accessible storage medium;
   a processor coupled to the storage medium;
   a gradient effect modeler comprising a set of instructions which are stored is the storage medium and which, when executed by the processor, cause the processor:
     to create a gradient stack comprising a plurality of gradient paths, each gradient path comprising a plurality of control points and a relative position within a gradient field, and a secondary path that intersects the gradient paths in the gradient field;
     wherein each control point is selected from the group of control points consisting of a color control point, an opacity control point, and a combined color and opacity control point; and
     wherein any one gradient path is positionally independent of any other gradient path in the gradient field, and each control point is positionally independent of any other control point;
     to instantaneously calculate a gradated color and or opacity along each gradient path, using each of a series of first selected regions of the gradient path,
     where, for each first selected region, the gradated color and or opacity is assigned based upon (1) color and or opacity of control points along the gradient path adjacent each first selected region, and (2) relative distances between the first selected region and the adjacent control points;
   to instantaneously calculate a gradated color and or opacity over the gradient field along the secondary path, using each of a series of second selected regions of the secondary path,
     where, for each second selected region, a color and or opacity is assigned based upon 1) the color and or opacity of the first selected region on the gradient path from which the secondary path extends and the color and or opacity of point or small region on the gradient path that the secondary path intersects, and 2) relative distances between the second selected region and the extended from and intersected gradient paths; and
     to instantaneously render a gradient field model based on the calculations.

2. The system of claim 1 wherein a position of each control point within the gradient field is selectively re-positionable, independent of any other control point, whether existing or later added.

3. The system of claim 1 wherein a color of each control point is selectively re-colorable, independent of any other control point, whether existing or later added.

4. The system of claim 1 wherein a position of each gradient path within the gradient field is selectively re-positionable, independent of any other gradient path, whether existing or later added.

5. The system of claim 1 wherein the set of instructions when executed by the processor cause the processor to also instantaneously send the gradient field model to a graphic display platform.

6. The system of claim 1 wherein each of the one or more gradient paths is a line.

7. The system of claim 1 wherein each of the one or more gradient paths is a curved line.

8. The system of claim 1 wherein there are a plurality of gradient paths, and at least one gradient path is a curved line.

9. The system of claim 1 wherein the system also comprises a gradient stack editor comprising a set of instructions which are stored in the storage medium and which, when executed by the processor cause the processor to:
   display a gradient stack editor comprising a gradient field display, and at least one gradient editing tool selected from the list of editing tools consisting of a gradient path positioning tool, a gradient path positioning thumb, a gradient offset selection tool, a gradient path addition tool, a gradient path removal tool, a secondary path selection tool, a control point, a control point addition tool, a control point removal tool, a color selection tool, an opacity selection tool, a control point offset selection tool, a gradient path offset selection tool, a curve control point positioning tool;
   receive and store information from the at least one gradient editing tool;
   instantaneously re-evaluate gradated color and opacity for the gradient field; and
   instantaneously display the re-calculated gradient field within the gradient field display.

10. The system of claim 1 wherein a secondary path is orthogonal to at least one of the gradient paths.

11. The system of claim 1 wherein the secondary path is angled to at least one of the one or more gradient paths.

12. The system of claim 1 wherein the secondary path is a curved line.

13. The system of claim 1 wherein any secondary path is independent from any other secondary path.

14. The system of claim 13 wherein a first secondary path over which a gradient path propagates its colors in the gradient field is at a first angle at a first position on the gradient path, and a second secondary path is at a second angle at a second position on the gradient path.

15. A method for creating and rendering a color gradient field, the method comprising:
   creating, by instructions executed by a processor, a gradient stack comprising a plurality of gradient paths, each gradient path comprising a plurality of control points and a relative position within a gradient field, and a secondary path that intersects the gradient paths in the gradient field;
   wherein each control point is selected from the group of control points consisting of a color control point, an opacity control point, and a combined color and opacity control point; and
   wherein any one gradient path is positionally independent of any other gradient path in the gradient field, and each control point is positionally independent or any other control point;
   instantaneously calculating by instructions executed by a processor, a gradated color and or opacity along each gradient path, using each of a series of first selected regions of the gradient path, where, for each first selected region, the gradated color and or opacity is assigned based upon (1) color and or opacity of control points along the gradient path adjacent each first selected region, and (2) relative distances between the first selected region and the adjacent control points;

instantaneously calculating by instructions executed by a processor, a gradated color and or opacity over the gradient field along the secondary path, using each of a series of second selected regions of the secondary path, where, for each second selected region, a color and or opacity is assigned based upon 1) the color and or opacity of the first selected region on the gradient path from which the secondary path extends and the color and or opacity of point or small region on the gradient path that the secondary path intersects, and 2) relative distances between the second selected region and the extended from and intersected gradient paths; and instantaneously rendering, by instructions executed by a processor, a gradient field model based on the calculations, and sending, by instructions executed by a processor, the gradient field model to a graphic display platform.

16. The method of claim 15 wherein the method also comprises:

displaying, by instructions executed by a processor on a visual display device, a gradient stack editor, the display comprising a gradient field display, and at least one gradient editing tool selected from the list of editing tools consisting of a gradient path positioning tool a gradient path positioning thumb, a gradient offset selection tool, a gradient path addition tool, a gradient path removal tool, a secondary path selection tool, a control point, a control point addition tool, a control point removal tool, a color selection tool, an opacity selection tool, a control point offset selection tool, and a gradient path offset selection tool, a curve control point positioning tool;

receiving, by instructions executed by a processor, and storing, in a tangible storage medium, information from the at least one gradient editing tool;

re-calculating, by instructions executed by a processor, gradated color and or opacity for the gradient field; and displaying, by instructions executed by a processor, on a visual display device the re-calculated gradient field within the gradient field display.

17. A system for creating and rendering a color gradient field, the system comprising:

a computer input device;

a tangible computer-accessible storage medium;

a processor coupled to the storage medium;

a gradient stack editor comprising a set of instructions which are stored in the storage medium and which, when executed by the processor, cause the processor to create a gradient slack data structure residing on the storage medium, the gradient stack data structure comprising one or mere gradient paths, each gradient path comprising one or more color and or opacity control points, and a relative position within a gradient field; and a secondary path extending into the gradient field wherein each gradient path is independent of any others, and each color and or control point is independent of any others;

the gradient stack editor also comprising a plurality of effect tools, the tools comprising a set of instructions which are stored in the storage medium and which, when executed by the processor, cause the processor to receive the set of instructions and store information to the gradient stack data structure residing on the storage medium, the information indicative of gradient path attributes and color and or opacity control point attributes;

a gradient stack tool comprising a set of instructions which are stored in the storage medium and which, when executed by the processor, cause the processor to apply a gradient definition to the data of the gradient stack and to create a graphic document, the graphic document usable by an effect renderer.

* * * * *